US010554783B2

(12) United States Patent
Matthiesen et al.

(10) Patent No.: US 10,554,783 B2
(45) Date of Patent: Feb. 4, 2020

(54) NAVIGATION USING PROXIMITY INFORMATION

(71) Applicant: Lyft, Inc., San Francisco, CA (US)

(72) Inventors: Taggart Matthiesen, San Francisco, CA (US); Sergey Shlykovich, San Francisco, CA (US); Ethan Eyler, San Francisco, CA (US); Sebastian Brannstrom, San Francisco, CA (US); Jesse McMillin, San Francisco, CA (US); Sean Murphy, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 348 days.

(21) Appl. No.: 15/396,390

(22) Filed: Dec. 30, 2016

(65) Prior Publication Data

US 2018/0191863 A1    Jul. 5, 2018

(51) Int. Cl.
*G06F 15/16* (2006.01)
*H04L 29/08* (2006.01)
(Continued)

(52) U.S. Cl.
CPC ............ *H04L 67/327* (2013.01); *H04L 67/12* (2013.01); *H04L 67/18* (2013.01); *H04W 4/70* (2018.02); *H04W 8/005* (2013.01)

(58) Field of Classification Search
CPC ....... H04L 67/327; H04L 67/10; H04L 67/12; H04L 67/18; H04W 4/70; H04W 4/80; H04W 8/005
(Continued)

(56) References Cited

U.S. PATENT DOCUMENTS

D732,049 S    6/2015 Amin
9,066,206 B2    6/2015 Lin et al.
(Continued)

FOREIGN PATENT DOCUMENTS

KR    2012-0024135 A    3/2012
KR    10 1518140 B1    5/2015
(Continued)

OTHER PUBLICATIONS

International Search Report and Written Opinion as received in PCTUS2017068283, dated Apr. 17, 2018.

*Primary Examiner* — Philip B Tran
(74) *Attorney, Agent, or Firm* — Keller Jolley Preece

(57) ABSTRACT

Embodiments provide techniques, including systems and methods, for locating and navigating to the location of a requestor based on proximity between a requestor device and a provider device. For example, embodiments display proximity indicators to allow a provider to quickly, easily, and safely locate a requestor upon arrival near a request location. Further, in some embodiments, graphics associated with a proximity vector may be presented on a provider communication device to clearly display the navigation directions to the provider so that the provider may easily find their matched requestor without requiring additional communication between the provider and the requestor. Additionally, embodiments provide efficient navigation to riders by limiting display of proximity indicators for navigation until the provider is within a threshold distance to the request location to conserve system resources and communication between an on-demand matching system and the provider computing device.

22 Claims, 20 Drawing Sheets

(51) Int. Cl.
*H04W 4/70* (2018.01)
*H04W 8/00* (2009.01)

(58) Field of Classification Search
USPC .................................................. 709/217, 224
See application file for complete search history.

(56) References Cited

U.S. PATENT DOCUMENTS

| | | | |
|---|---|---|---|
| D734,349 S | 7/2015 | Amin et al. | |
| D738,901 S | 9/2015 | Amin | |
| 9,151,614 B2 | 10/2015 | Poppen et al. | |
| D743,978 S | 11/2015 | Amin | |
| 9,230,292 B2 | 1/2016 | Amin et al. | |
| D750,110 S | 2/2016 | Amin et al. | |
| D759,032 S | 6/2016 | Amin et al. | |
| 9,494,938 B1 | 11/2016 | Kemler et al. | |
| 9,536,271 B2 | 1/2017 | Kalanick et al. | |
| 2013/0132140 A1* | 5/2013 | Amin | G06Q 10/02 705/7.13 |
| 2014/0011522 A1* | 1/2014 | Lin | H04W 4/023 455/456.2 |
| 2014/0129951 A1* | 5/2014 | Amin | G06O 50/30 715/738 |
| 2015/0339923 A1* | 11/2015 | Konig | G08G 1/202 701/522 |
| 2015/0356470 A1* | 12/2015 | Mitchell | G06Q 30/08 705/5 |
| 2016/0293012 A1* | 10/2016 | Lubeck | H04W 4/029 |
| 2016/0321771 A1* | 11/2016 | Liu | G06Q 50/30 |
| 2016/0349067 A1 | 12/2016 | Fowe | |
| 2017/0147959 A1* | 5/2017 | Sweeney | G05D 1/0022 |
| 2017/0178269 A1* | 6/2017 | McKinnon | G06Q 10/06311 |
| 2017/0193404 A1* | 7/2017 | Yoo | G06Q 10/02 |
| 2017/0350719 A1* | 12/2017 | Moore | G01C 21/3682 |
| 2018/0060827 A1* | 3/2018 | Abbas | G05D 1/0088 |
| 2018/0089605 A1* | 3/2018 | Poornachandran | G06Q 10/06393 |

FOREIGN PATENT DOCUMENTS

| | | |
|---|---|---|
| KR | 2016-0063474 A | 6/2016 |
| WO | WO 2018/125827 | 7/2018 |

* cited by examiner

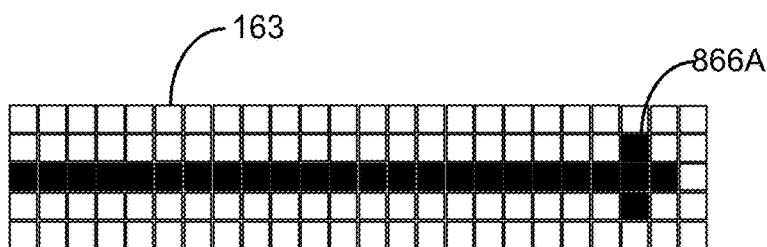 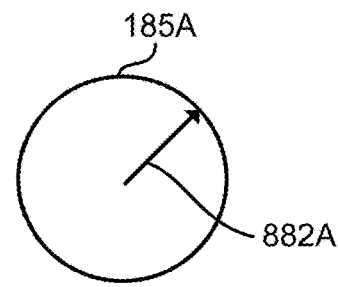
*FIG. 8A*
 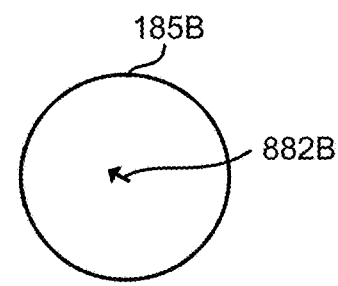
*FIG. 8B*
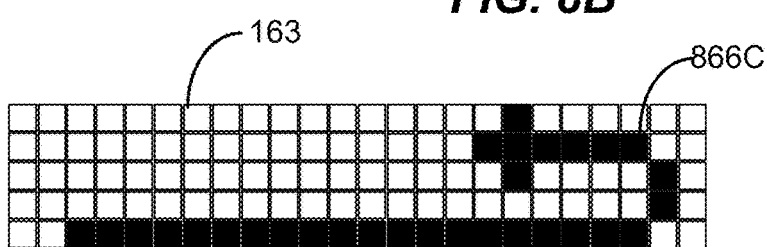 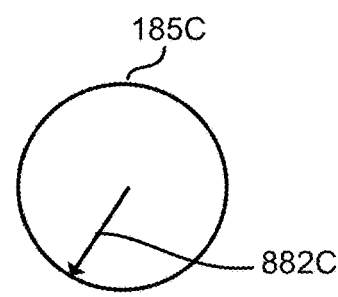
*FIG. 8C*
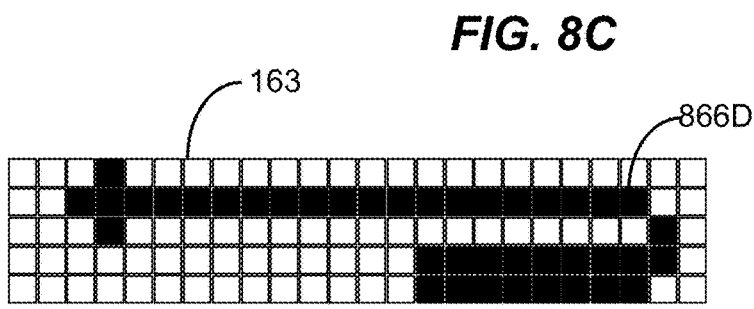 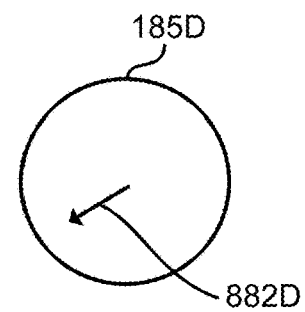
*FIG. 8D*
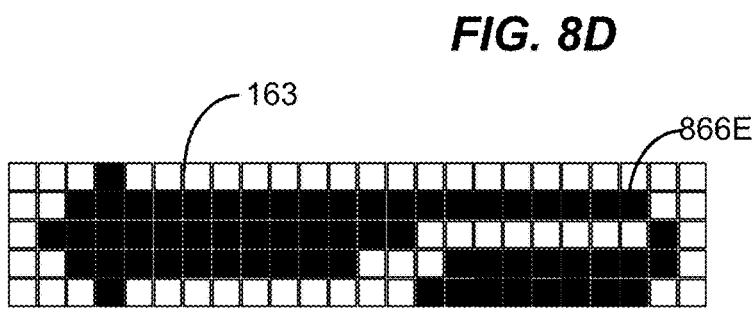 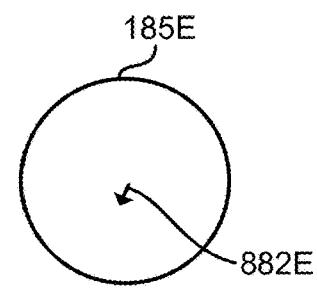
*FIG. 8E*

NAVIGATION USING PROXIMITY INFORMATION

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. Additionally, on-demand service matching systems may select and provide requests to service providers based the location and status of service providers near a request location. Accordingly, on-demand matching systems may monitor system resources and control efficient resource allocation based on demand-matching between requestors and providers distributed through a geographic area. However, as such services have become more prevalent, and more users are interacting with such services, it can be difficult to identify which requestor is associated with a service provider at a geographic request location. This leads to inefficient resource allocation as the misidentification of service providers and requestors at a request location leads to delay, canceled and duplicated requests, as well as mistaken matches between requestors and providers at a request location.

BRIEF DESCRIPTION OF THE DRAWINGS

Various embodiments in accordance with the present disclosure will be described with reference to the drawings, in which:

FIGS. 8A-8E illustrate exemplary proximity indicators configured to be presented on a rear display of the provider communication device and corresponding proximity vectors, in accordance with an embodiment of the present techniques;

DETAILED DESCRIPTION

Figure 1:
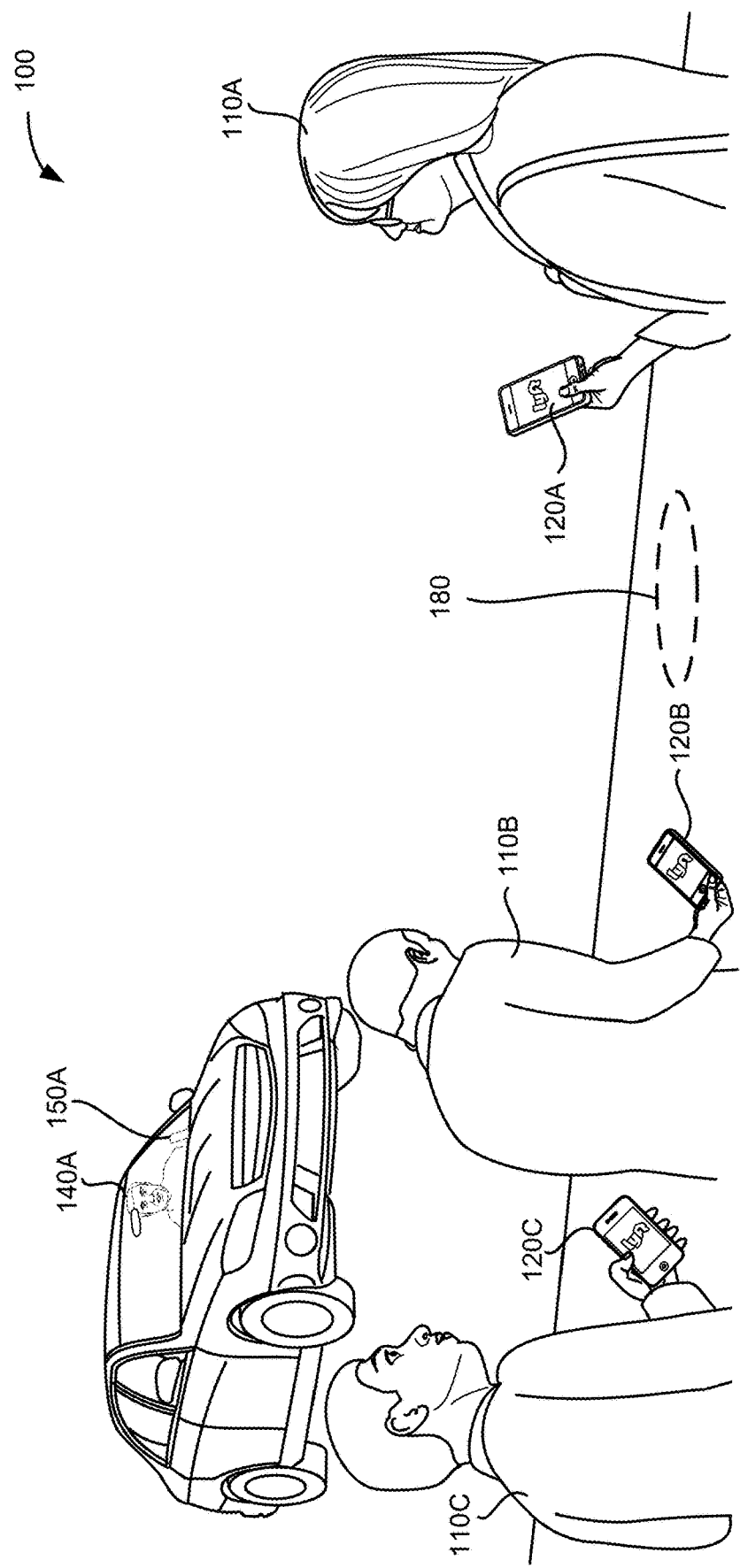
FIG. 1 illustrates an example of an environment including multiple requestors and a provider at a request location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services that are accessed through mobile devices are becoming more prevalent. However, due to the distributed nature of unknown providers and requestors being matched by an on-demand matching system, it can be difficult for providers and requestors to identify one another at the point of service. Additionally, it can be difficult to locate a requestor as there may be multiple requestors in the same area. This leads to delay, misidentification, and mismatching of providers and requestors at the point of service. For example, multiple requestors may request services at the same address and may have trouble identifying whether a service provider is associated with their request or another request. Similarly, it can be difficult for a provider to identify which of multiple requestors is associated with a request. Moreover, requestors may use a street address or building address as a request location for a service but the address and/or location may have multiple entry and exit points. As such, service providers may arrive at a location but may be on the wrong side of a building, at the wrong exit point, and/or may otherwise have difficulty navigating to the correct requestor. Accordingly, it can be difficult to identify and/or locate a location of a requestor once the service provider has arrived at a requested location. The difficulty in locating requestors leads to delay in the providing of services which can lead to mismanagement of provider resources as well as increased data processing and system communications as requestors cancel requests, place new requests, and require account corrections.

For example, traditionally in ride matching environments that allow drivers and riders to be matched through a mobile application on their smart phones, it can be difficult to identify the exact location of a rider upon arrival at a street address and/or building address. This can lead to people canceling requests as it takes too long for the driver to locate the rider. Additionally, sometimes a rider may request a pick-up at a street level of a building but may later realize that the location is not good for a pick up as there is heavy congestion, street closures, and/or other issues. As such, a requestor may walk down the block to a better pick-up location. As such, the driver may arrive but may not be able to find the requestor as they are no longer at the request location. The rider may cancel their ride request when there is a delay by the driver and/or additional system resources must be used by the rider and/or driver through the initiation of phone calls, text messages, and/or other contact methods to identify the exact location of one another. This can cause dangerous situations when a driver's attention is off the road and/or can lead to further delay. As such, riders may cancel the ride request and request a new ride which can lead to increased system resources usage as more requests are required to fulfill the same rider demand. Additionally, the new ride request can lead to congestion in pick-up locations as additional drivers arrive at the location, further exacerbating the original congestion and confusion at the request location. This can be particularly troublesome at concerts and other high traffic events (e.g., airports, etc.) where many people may desire a pick-up in the same area at around the same time. In such areas, pick-up locations can be very congested and it can be very difficult for a driver to locate a rider based on request location alone.

Embodiments provide techniques, including systems and methods, for locating and navigating to the location of a requestor based on proximity between a requestor and provider. For example, embodiments allow the use of proximity indicators to allow a provider to quickly, easily, and safely locate a requestor upon arrival near a request location. Further, in some embodiments, graphics associated with a proximity vector may be presented on a provider communication device to clearly display the navigation directions to the provider so that the provider may easily follow the proximity indicators to find their matched requestor without requiring additional communication between the rider and the driver. Further, embodiments can provide efficient navigation to riders by limiting device location-based navigation until the driver is within a threshold distance to the request location to conserve system resources and communication between the on-demand matching system and the provider computing device.

Moreover, embodiments provide intuitive and easily interpretable user interfaces and graphical presentations of navigation information to lead a driver to the requestor's location. Additionally, by providing an efficient mechanism to identify requestor location upon arrival near the request location, embodiments minimize system communications and data processing loads by using request location as an initial navigation point and the requestor computing device as a fine-grain navigation point once close to the request location. Further, by more efficiently identifying the specific location of the requestor computing device and limiting delays in providing services to requestors, embodiments limit the use of system resources for unnecessary canceled ride requests and the issuance of new ride requests as well as the lost downtime and increased throughput of providers.

FIG. 1 illustrates an example of an environment 100 including multiple requestors 110A-110C and a provider 140A at a request location 180. Each requestor 110A-110C may have a requestor computing device 120A-120C and the provider 140A may have a provider computing device 150A. The requestor computing device may be used to request services (e.g., a ride or transportation, a delivery, etc.) that may be provided by the provider 140A. The provider computing device may be used to contact available providers and match a request with an available provider. However, it may be difficult for the provider to identify which requestor is matched with their request due to multiple requestors being located at the request location 180. For example, where the requestor is asking for a ride, multiple requestors may enter the same or nearly the same request location for a ride around the same time. As such, a provider may arrive at a pick-up location around the same time to find multiple requestors waiting for their respective matched provider. It may be difficult to identify which requestor is matched with which provider and/or it may be difficult to find the respective requestor when a request location is congested with multiple requestors and/or providers. Moreover, as explained above, it may be difficult to find which exit point to a building a requestor is located at and it may be difficult to find a requestor where the requestor moves away from the initial request location due to the congestion, confusion, and/or unforeseen problems at the request location. Accordingly, the provider may not be able to find the correct matched requestor and/or the provider may provide goods or other services to the wrong requestor. Thus, embodiments provide a solution that allows a provider to identify the specific location of the requestor based on a proximity between the provider computing device and the requestor computing device.

Figure 2:
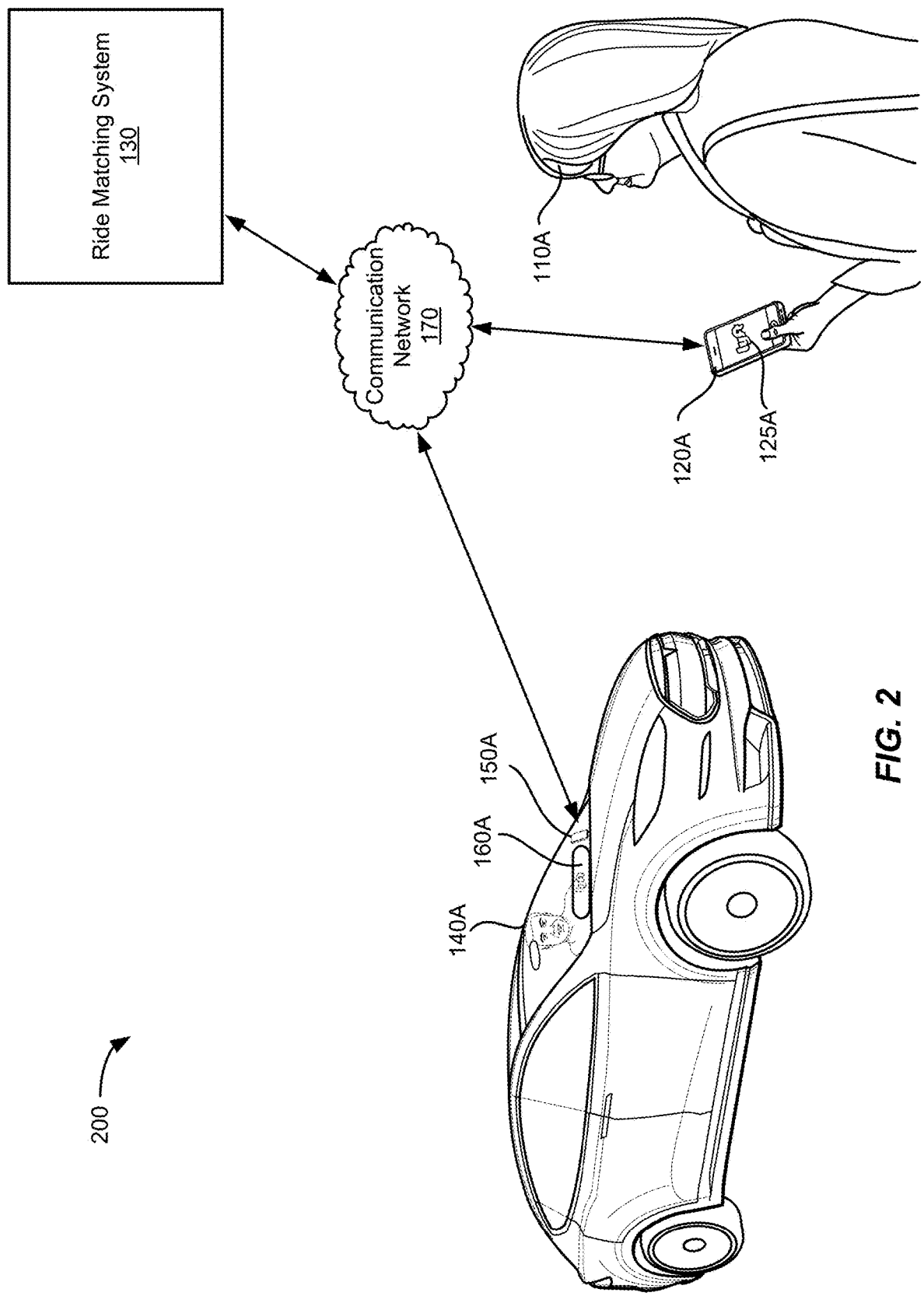
FIG. 2 illustrates an example of a ride matching system including a matched provider and requestor, in accordance with an embodiment of the present techniques.

FIG. 2 illustrates an example of a ride matching system 130 including a matched provider 140A and requestor 110A, in accordance with an embodiment of the present techniques. The ride matching system 130 may be configured to communicate with both the requestor computing device 120A and the provider computing device 150A. The provider computing device 150A may be configured to communicate with a provider communication device 160A that is configured to easily and efficiently display information to a provider 140A and/or a requestor 110A. The requestor 110A may use a ride matching requestor application on a requestor computing device 120A to request a ride at a specified pick-up location. The request may be sent over a communication network 170 to the ride matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/predictive" location, a curb segment, or any other suitable information for indicating a location for a requestor to be found at the current time or in the future. In some embodiments, the transport request may further include other request related information including, for example, requestor transport preferences (e.g., highway vs. sidestreets, temperature, music preference (link to 3<sup>rd</sup> party music provider profile, etc.), personalized pattern/color to display on provider communication device, etc.) and requestor transport restrictions (e.g., pet friendly, child seat, wheelchair accessible, etc.).

The ride matching system (also referred to as a "dynamic transport matching system") 130 may identify available providers that are registered with the ride matching system 130 through an application on their provider communication device 150A. The ride matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the driver providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the ride matching system 130 may dynamically match requestors and providers that are distributed throughout a geographic area.

The ride matching system 130 can monitor the location of the respective requestor computing device and provider computing device and send location information to the respective other device. Thus, as the provider computing device gets closer to the request location, the ride matching system may monitor the location of the provider computing device and may send the location of the requestor computing device to the provider computing device. As such, the provider computing device may receive the location of the requestor computing device to allow the provider to identify the specific location of the requestor. Accordingly, the provider computing device may determine a proximity vector between the present location of the provider computing device and the location of the requestor computing device and instructions navigating the provider to the exact location of the requestor may be provided to the provider. For example, a proximity indicator corresponding to a color, pattern, image, animation, and/or pattern of colors to be presented on a display of the corresponding computing device may be determined and presented to the provider to navigate the provider to the location of the requestor. Proximity indicators may also include additional or other types of multimedia elements such as sounds, audio/visual presentations, haptic feedback (e.g., vibrations, etc.), holograms, augmented reality presentations, etc. For example, the proximity indicator associated with haptic feedback may vibrate one side of the steering wheel and/or may vibrate stronger or weaker depending on the distance to the requestor computing device. The provider computing device 150C may present the proximity indicator that can quickly and easily navigate the driver to the location of the requestor. In some embodiments, the provider computing device 150C may pass the proximity indicator to a provider communication device 160C that is configured to present the corresponding color, pattern, pattern of colors, animation, and/or image on a large display that can easily, intuitively, and safely be followed by the driver to the location of the requestor. Moreover, in some embodiments, the provider computing device 150C may pass the proximity indicator to one or more other displays and/or devices that may be located in a vehicle (e.g., seat displays, in-vehicle displays, user computing devices located within the vehicle, etc.).

Additionally and/or alternatively, in some embodiments, an interaction indicator associated with requestor information associated with a matched ride may be displayed based on proximity to the requestor computing device. For example, an interaction indicator including a name, a graphic, and/or a greeting associated with the requestor information may be presented to the requestor upon arriving near and/or within a distance threshold of the requestor computing device. The requestor information may be sent to the provider computing device as part of matched information associated with a request. Accordingly, similar to the techniques described herein related to the proximity indicator, the interaction indicator may be displayed to provide a welcoming interaction with the requestor upon the requestor approaching and/or entering a vehicle of the provider. Similar to the proximity indicator, the interaction indicator may be displayed on any number of different displays within the provider vehicle and/or through the provider communication device. Additionally, the same techniques described herein regarding the provider computing device may be implemented by the requestor computing device to display an interaction indicator and/or proximity indicator on the requestor computing device or a display associated with the requestor computing device.

Figure 3:
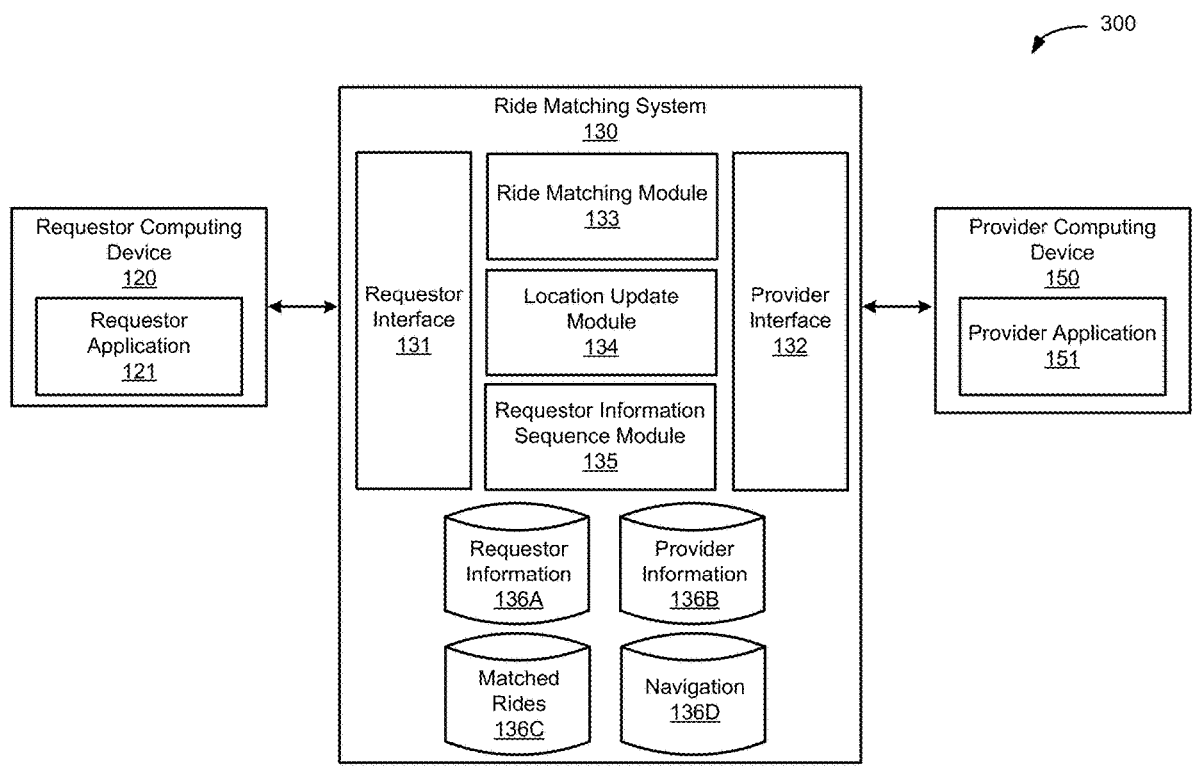
FIG. 3 illustrates an example block diagram of a ride matching system, in accordance with an embodiment of the present techniques.

FIG. 3 illustrates an example block diagram 300 of a ride matching system 130, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, a ride matching module 133, a location update module 134, and a requestor information sequence module 135. The ride matching system 130 may also include a requestor information data store 136A, a provider information data store 136B, a matched rides data store 136C, and a navigation data store 136D which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar requests and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, a location of the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a ride requests data store 136C with the ride request information.

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information.

A requestor computing device 120 may include any device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130.

The provider interface 132 may include any software and/or hardware configured to send and receive communications and/or other information between the ride matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider computing device location, and/or any other relevant information.

A provider computing device 150 may include any computing device that is configured to communicate with a ride matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the ride matching system 130, and/or obtain any other provider-oriented information from the ride matching system 130. The provider computing device 150 and the provider application 151 will be discussed in further detail in reference to FIG. 4.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region. The ride matching module 133 may provide the ride request to the provider interface 132 with the provider contact information or provider identifier so that the ride request may be sent to one or more available providers.

The ride matching module 133 may send the ride request and/or the information from the ride request to one or more of the available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, an estimated time of arrival for the provider, and/or any other suitable information to allow the requestor and the provider to complete the requested service. The ride matching module 133 may update the matched rides data store 136C with the corresponding matched ride information for the matched ride.

The location update module 134 may include a software module that is configured to track the location of the provider computing device and the requestor computing device and provide location information to each of the respective devices to facilitate navigating the provider computing device to the requestor computing device (or vice versa). For example, the location update module 134 may be configured to identify when a provider computing device is within a threshold distance to a request location and/or when a provider computing device requests a location of a requestor computing device and provide the respective location to the provider computing device. For instance, the ride matching module 133 may send a request to the location update module 134 in response to a matched ride. The location update module 134 may receive a requestor computing device identifier, a provider computing device identifier, and a pick-up location associated with a matched ride from the ride matching module 133 and may track the progress of the provider computing device 150 in relation to the request location. For example, the location update module 134 may obtain and monitor the location of the provider computing device 150 from the provider information data store 136B and once the provider computing device 150 is within a threshold distance of the request location, the location update module 134 may send the location of the requestor computing device 120 to the provider computing device 150. The provider computing device 150 may then calculate a proximity vector between the location of the provider computing device 150 and the requestor computing device 120 to locate the exact location of the requestor computing device 120 as will be described in further detail below. Similarly, the location update module 134 may identify and monitor the location of the provider computing device 150 and send the location to the requestor computing device 120 upon being within a threshold distance to the provider computing device 150. In some embodiments, the location update module 134 may periodically and/or upon another condition being met, send location updates to both the requestor computing device and the provider computing device for the location of the corresponding device (e.g., provider device location being sent to requestor device and vice versa). Additionally, in some embodiments, the location update module 134 may use the location of each respective device to calculate and provide the proximity vector between the two devices and send the corresponding vector to the provider computing device and/or the requestor computing device as will be described in further detail below.

The requestor information sequence module 135 may include a software module that is configured to identify a sequence of destination locations corresponding to multiple drop-off locations for multiple riders that have matched with a particular provider. For example, in some embodiments, a provider may pick up multiple different requestors during a single ride or trip. Each of the multiple riders may have different destination (i.e., drop-off) locations. The requestor information sequence module 135 may be configured to optimize the navigation route of the provider to obtain the most efficient and/or time sensitive route to drop off the multiple requestors at the multiple destinations. Further, the requestor may not know which drop-off location is being navigated to and may not be prepared to be dropped-off upon arrival at their location. Accordingly, the requestor information sequence module 135 may be configured to identify the requestor associated with the next drop-off location and send that information to the provider computing device for delivery to the requestors. Additionally, in some embodiments, the requestor may receive a notification informing them that they are next and/or providing information including an estimated drop-off time, a sequence of the respective requestor drop-offs, and/or any other suitable information.

The requestor information sequence module 135 may be configured to obtain the location of the provider computing device and the plurality of destination locations of the plurality of matched rides associated with the provider. The requestor information sequence module 135 may receive the provider location information and the destination locations from the ride matching module 133, by obtaining the information from the matched rides data store 136C, and/or by obtaining the information from the provider information data store 136B and the requestor information data store 136A. The requestor information sequence module 135 may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type of transportation (e.g., driving, biking, sailing, flying, etc.). The requestor information sequence module 135 may map a plurality of possible routes from the provider location to each of the destination locations in a variety of different sequences of drop-offs and generate an estimated arrival time for each of the potential mapped routes. The requestor information sequence module 135 may incorporate current traffic conditions, road closures, weather conditions, and any other relevant travel time related information to calculate an estimated arrival time for the provider for each of the destination locations in each of the sequences of drop-offs.

Once estimated travel times have been calculated for each of the potential routes, the requestor information sequence module 135 may select a sequence of the destination locations that leads to the fastest drop-off times for each of the matched requestors. The estimated arrival time may be calculated by taking an average of the arrival time of each of the mapped routes, selecting the estimated arrival time for the fastest route, receiving a selection of one of the potential routes by the provider, identifying the route being taken based on the route being used by the provider, and/or through any other suitable method. If the provider makes a wrong turn and/or follows a different route than that calculated by the requestor information sequence module 135, the requestor information sequence module 135 may obtain the updated location of the provider computing device and recalculate the possible routes and estimated arrival times to recalculate the sequence of requestors associated with the sequence of destination locations. As such, the requestor sequence may be updated as travel and road conditions, weather, etc. are updated. Accordingly, the requestor information sequence module 135 may determine a navigation route associated with the multiple drop-off locations and a destination sequence associated with the navigation route that identifies the order of drop-offs of the requestors associated with the various destinations.

The requestor information sequence module 135 may also obtain requestor information associated with each of the requestors of the requestor sequence and/or destination sequence. For example, the requestor information sequence module 135 may identify a requestor associated with each of the destinations in the destination sequence, obtain requestor information from a requestor information data store for each requestor, and send the requestor information along with the destination sequence to the provider computing device 150. The provider computing device may then be configured to display the requestor information for each of the respective destinations to the requestors located in the vehicle in the sequence of drop-offs from the destination sequence.

In some embodiments, the requestor information sequence module 135 may be called by the ride matching module when the ride matching module identifies a provider is associated with multiple destination locations and/or multiple requestors. Additionally, in some embodiments, the requestor information sequence module 135 may analyze the presence of multiple requestors associated with a provider whenever a destination location is updated in the system. For example, the ride matching module 133 may call the requestor information sequence module 135 whenever matched ride information is updated for any matched rides within the ride matching system 130. For instance, previously matched rides may be updated to have multiple requestors and multiple corresponding destination locations associated with a particular ride. As such, multiple requestor rides may be identified and a destination order or requestor information sequence may be identified for a matched ride based on updates mid-ride and/or whenever an update occurs to a matched ride. Moreover, in some embodiments, the estimated arrival time for the multiple destinations may be periodically tracked to ensure that traffic conditions, mistakes (i.e., errant turns) of a provider, inaccuracies in the mapping information, and/or any other potential issues that may delay the arrival time of a provider are monitored to identify if updated estimates show that the requestor information sequence should be updated.

Figure 4:
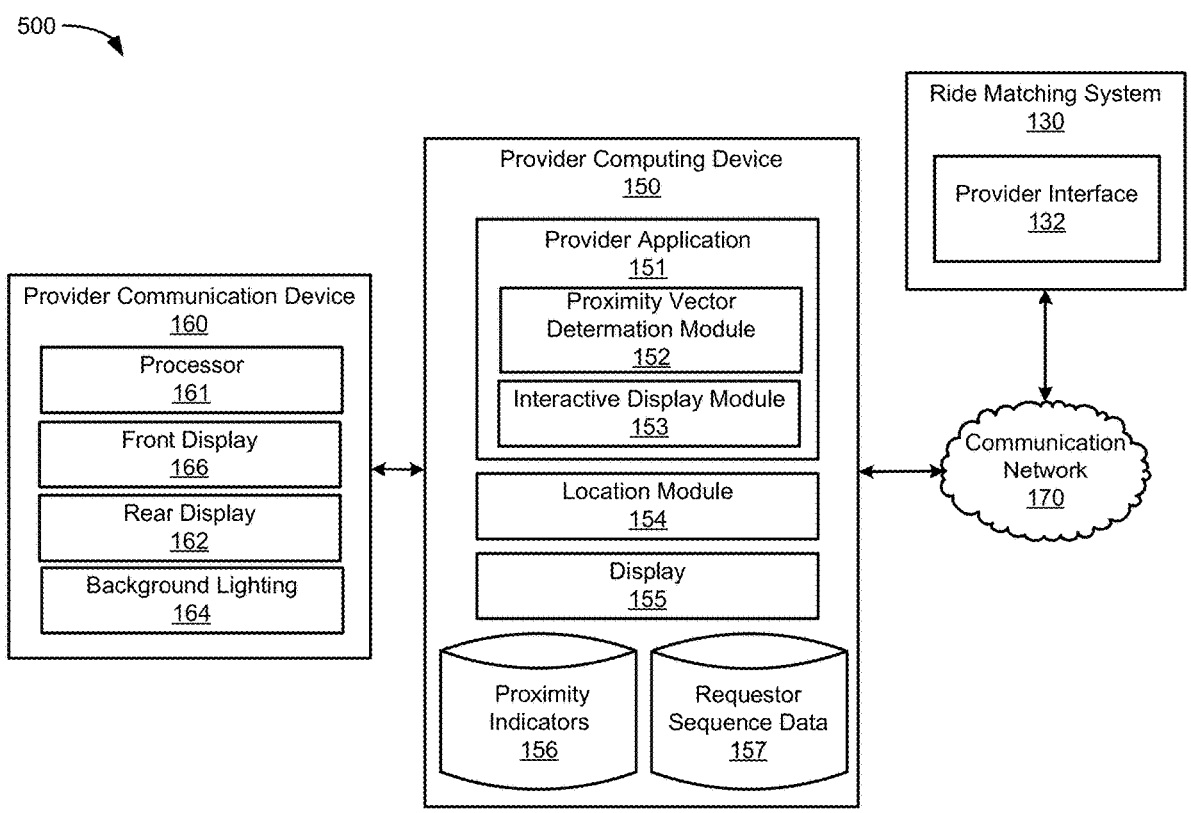
FIG. 4 illustrates an example block diagram of a provider computing device communicating with a ride matching system and a provider communication device, in accordance with an embodiment of the present techniques.

FIG. 4 illustrates an example block diagram 400 of a provider computing device 150 communicating with a ride matching system 130 and a provider communication device 160, in accordance with an embodiment of the present techniques. As described above, the provider computing device 150 is configured to communicate with the ride matching system 130 to receive and provide a response to a request to provide a service. The provider computing device 150 may communicate with the ride matching system 130 through one or more communication networks 170. The provider computing device 150 may communicate with the provider communication device 160 through a wired or wireless connection. For example, the devices may be paired using Bluetooth™ or another short range communication protocol.

The provider application 151 of the provider computing device 150 is configured to receive the matched ride information including a request location from the provider interface 132 of the ride matching system 130. The provider application 151 may obtain a navigation route to the request location, communicate ride related information to the ride matching system, and/or otherwise interface with the ride matching system as described herein. The provider application may obtain a navigation route to the request location through any suitable method. For example, the ride matching system could provide the navigation instructions directly or could include a link to map information from which one or more navigation routes can be determined and/or any other information that allows the provider computing device to identify navigation directions to a location.

A proximity vector determination module 152 is configured to calculate a difference in location between a present location of the provider computing device and a requestor computing device and determine navigation instructions to locate the requestor computing device. For example, the proximity vector determination module may receive a location of a requestor computing device from a ride matching system and calculate a magnitude and a direction of the difference between the location of the provider computing device and the location of the requestor computing device. The proximity vector determination module may obtain the location of the provider computing device from the location module.

The proximity vector determination module 152 may calculate a magnitude and direction of the difference between the locations through any suitable method. For example, the proximity vector determination module may be configured to receive coordinates for two locations and calculate the difference between the two coordinates. For instance, the coordinates may be provided in the format of a longitude and latitude for each location. The magnitude may include the distance between the two coordinates. The direction may be defined in reference to a location and direction corresponding to the provider computing device. For example, the reference direction may be defined according to a direction of travel of the provider computing device. As such, the proximity vector may be defined in relation to the direction of travel of the provider computing device and/or the navigation route in the direction of the request location from the location of the provider computing device.

Once the proximity vector is determined, the interactive display module 153 may receive the proximity vector from the proximity vector determination module 152 and identify a proximity indicator associated with the proximity vector. The interactive display module 153 may select a proximity indicator that is associated with the magnitude and the direction of the difference between the location of the provider computing device and the location of the requestor computing device. The proximity indicators may include any animation, color, pattern, image, or pattern of colors that indicate a direction, a distance, and/or a direction and a distance to the location of the requestor computing device. Additionally and/or alternatively, in some embodiments, the proximity indicator may include sounds, haptic feedback commands, and/or any other suitable information that may be used to indicate a distance and/or direction to a provider. The variety of proximity indicators may be stored in a proximity indicators data store 156 and the interactive display module 153 may be configured to submit the magnitude and direction of the proximity vector and obtain a corresponding proximity indicator associated with the magnitude and direction from the proximity indicators data store 156. The proximity indicators data store 156 may include a table of magnitudes and directions to proximity indicators. The proximity indicators data store 156 may associate a variety of different magnitudes and directions with one or more proximity indicators such that the proximity vector determination module may obtain the closest proximity indicator associated with the magnitude and direction without requiring a different proximity indicator for the various iterations of magnitude and direction available. For example, a proximity indicator may be associated with any magnitudes over 15 feet and a direction between 235-270 degrees. As such, any proximity vectors matching these two criteria may return the same proximity indicator. As the magnitude and/or direction of the proximity vector changes as the provider gets closer to the requestor and/or the angle between the provider and the requestor changes, the proximity indicator may change to the next corresponding matching proximity indicator.

The interactive display module 153 of the provider application 151 may be configured to cause the proximity indicator associated with the proximity vector to be displayed. The interactive display module 153 is configured to identify and present a graphic including a pattern, a color, an image, and/or any other information that is associated with the proximity indicator on a display 155 of the provider computing device 150 as well as on one or more displays 162-164 of the provider communication device 160. The interactive display module 153 may send the identified graphical proximity indicator including the pattern, image, animation, and/or colors associated with the proximity indicator to the provider communication device 160 for presentation by the provider communication device 160. For example, the interactive display module may cause graphics corresponding to the proximity indicator to be presented on a rear display 162 of a provider communication device 160 so that a provider may follow the navigation instructions associated with the proximity indicator to the location of the requestor.

The location module 154 may track the location of the provider computing device 150 using any suitable technology. For example, the location module may include a GPS transceiver, network triangulation components, and/or any other suitable technology to identify the present location of the provider computing device. The location module 154 may provide the location of the provider computing device 150 to the provider application 151 for reporting to the ride matching system 130 and/or use by the proximity vector determination module 152.

In some embodiments, the proximity vector determination module 152 may use information from the location module 154 to determine when the provider computing device 150 is located within a threshold distance from a request location. Once the provider computing device 150 is within the threshold distance, the provider application 151 and/or the proximity vector determination module 152 may send a request for a location of the requestor computing device 120 from the ride matching system 130, receive the location of the requestor computing device 120 from the ride matching system 130, and calculate the proximity vector as described above.

Additionally, in some embodiments, the magnitude of the proximity vector may be compared to a display threshold to identify whether the magnitude is small enough to start displaying a corresponding proximity indicator. For example, it may not be worthwhile to start displaying proximity indicators to a provider until the provider is close enough to the requestor to follow the navigation instructions displayed through the proximity indicator. As such, if the magnitude is above the display threshold (meaning that the location of the requestor computing device is over a distance threshold away from the provider), the proximity indicator may not be displayed until the magnitude is smaller than the threshold.

The proximity indicators data store 156 may include proximity indicators that have been configured for display by the provider computing device 150 and/or the provider communication device 160. The proximity indicators may be stored with constraints or rules that dictate when and/or where an proximity indicator may be available to be deployed. For example, some proximity indicators may be limited to particular geographic regions, providers, requestors, times of day, etc. Some patterns, colors, patterns of colors, images, etc., may be preferred by users and/or may be easier to distinguish when being used. For instance, in inclement weather (e.g., rain, fog, etc.), certain colors may be utilized over other colors in order to increase visibility. Additionally, proximity indicators may be selected based on data such as user data. For example, data may be received that a particular user is color-blind; therefore, only certain colors, patterns, etc. may be used from which to select proximity indicators. In some cases, audio may be used in place of visual indicators, for instance if it is determined that a user is visually impaired. Additionally, graphics associated with proximity indicators may be customized by users and/or designed by users of the ride matching system 130. Thus, different user accounts may have custom and/or preferred proximity indicators.

Additionally, in some embodiments, the interactive display module 153 of the provider application 151 may be configured to display requestor information associated with a destination sequence of drop-offs for multiple requestors that are matched with a provider. For example, in some embodiments, the interactive display module may be configured to identify a requestor associated with the next destination location of the provider, select the requestor information from a requestor sequence data store 157, and display the requestor information upon an event. The event may include the arrival at a destination location, traveling within a threshold distance of a destination location, completion of a prior destination drop-off, and/or through any other suitable event.

The interactive display module 153 of the provider application 151 may identify a first destination based on the destination sequence received from the ride matching system and may determine a distance to the first destination based on a location of the provider computing device and the location of the first destination. In some embodiments, the distance may be based on the navigation route (e.g., may be based on an arrival time and/or a navigation route and may incorporate traffic, road conditions, etc.) and/or may be based on a direct distance between two coordinates without considering the navigation route and/or traffic conditions. The interactive display module may determine whether the distance to the first destination is within a notification distance threshold of the destination location by comparing the identified arrival time, distance metric, and/or other information for identifying how close the provider is to the destination location to a threshold distance and/or arrival time indicator for notifying the requestor of the next drop-off. For example, the system may only notify a requestor when they are within a couple blocks of the drop-off location to avoid multiple notifications and annoying the other passengers for the ride. Additionally, in some embodiments, multiple notifications may be displayed such that the requestor is notified upon drop-off of a prior requestor and when the provider is within a display threshold of the destination location.

Once the provider is within the notification threshold distance, the interactive display module may be configured to determine first requestor information associated with the first destination of the destination sequence from a requestor sequence data store 157 and present the first requestor information on a display of the provider computing device. As explained above, the requestor information may include any suitable information to indicate to the passengers which requestor is next to be dropped off. Additionally, the requestor information may be incorporated into a previously generated animation such that at least a portion of the animation is personalized for each requestor. For instance, FIGS. 12A-12C show one example of an animation including requestor information indicating the next requestor to be dropped-off. The portions of the animation shown in FIGS. 12A and 12B may be displayed for all requestors while the portion shown in FIG. 12C is personalized for each requestor by displaying the first and/or last name of the requestor. Other requestor information may be displayed in other embodiments including pre-selected images, videos, profile pictures, gifs, and/or any other information that may be capable of being displayed by the provider computing device, requestor computing device, and/or provider communication device. As described above, in some embodiments, the requestor information may be used to display an interaction indicator that displays a greeting, a name, and/or any other information about the requestor upon entry into a vehicle or based upon proximity to a vehicle as the requestor computing device and the provider computing device approach one another. Similarly, the requestor information described herein may be used in such an embodiment to display additional information about the requestor and/or provider to the corresponding party.

The requestor sequence data store 157 may include requestor information associated with the requestors that are matched to the provider. The requestor sequence data store 157 may organize the requestor information in a sequence according to destination location and/or a destination sequence associated with a navigation route of the provider. The requestor information may include any suitable information for identifying a requestor associated with a next destination of the provider. For example, the requestor information include a name, initials, a designated icon, image, animation, gif, and/or any other suitable information that informs a requestor that they are the next entity to be dropped off at the next destination. The requestor information may be customized and/or selected for particular requestor and stored as being associated with the account profile of the requestor. The requestor sequence data may be provided by the provider interface of the ride matching system upon matching of the various requestors and may be updated as additional and/or fewer requestors are included in the destination sequence.

Additionally, in some embodiments, the interactive display module 153 of the provider application 151 may be configured to display other types of system information upon particular conditions being met and/or upon instruction from the ride matching system. For example, the interactive display module may be configured to display provider information including driver metrics (e.g., miles driven, amount earned, status towards a reward, etc.), high demand area navigation directions that may provide higher earning potentials, driver authentication information, and/or any other relevant information to the provider. The interactive display module 153 may be configured to receive the information and/or monitor the provider information for conditions that may be trigger the presentation of such information. For example, when a provider is 5 matched rides away from a reward, the interactive display module 153 may be configured to display such a notice to the provider through a provider communication device in line with the description herein. Further, the proximity navigation features described herein may be used to navigate a provider to a high demand area of a city, region, or state to allow the provider to earn more on their respective rides. Accordingly, the interactive display module 153 may be configured to present a variety of different types of information through a display on the provider computing device and/or a display on the provider communication device 160.

The provider communication device 160 is configured to display the corresponding graphics associated with the proximity indicator and/or the requestor information including patterns, colors, and/or images on a front display 162, rear display 163, and/or background lighting 164 of the provider communication device 160. The provider communication device 160 may include a processor 161, a front display 162, a rear display 163, and background lighting 164. The processor 161 may be configured to receive instructions related to displaying graphics and/or other information associated with the provider application 151 from the provider computing device 150 and present those graphics on one or more of the front display 162, rear display 163, and/or background lighting 164. The processor 161 may be configured to control each of the displays independently and/or as a group. Examples of proximity indicators displayed on a rear display of a provider communication device 160 can be found in reference to FIGS. 7A-7F, 8, and 9A-9E. Proximity indicators may also comprise multimedia elements such as sounds, videos, or any type of audio and/or visual presentation.

Additionally, the requestor computing device may include similar functionality to that described in reference to FIG. 4. As described above, the requestor computing device 120 is configured to communicate with the ride matching system 130 in order to request a service. The requestor computing device 120 may include a requestor application 121 having an interactive display module with corresponding proximity indicators data and a display. The requestor computing device may include communication components that allow the requestor computing device 120 to communicate over one or more communication networks 170. The requestor computing device 120 may also include a location module and/or other location identification components to allow the requestor computing device 120 to determine its current location and/or position. For example, the location module may implement global positioning system (GPS), cellular communications triangulation, and/or any other suitable location-based techniques to determine the coordinates or location of the requestor computing device 120. The requestor computing device may be configured to perform any of the features of the provider computing device and may have corresponding proximity vector determination modules and/or interactive display modules as described in reference to the provider computing device. As such, similar graphics as described above and below in reference to the provider computing device may be displayed on the requestor computing device as well. The display may include any suitable components to create visible and recognizable light. For instance, the display may include LED arrays, a LCD display, a projector, and/or any other components that create visible light, pixels, and/or images. Additional information regarding the computing devices may be found in reference to FIG. 17 below.

Figure 5A:
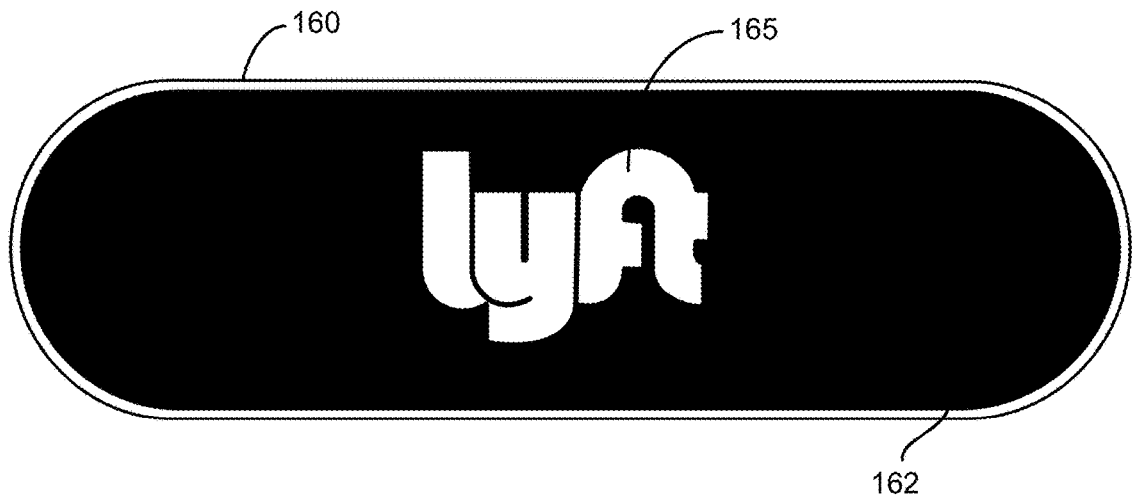
FIGS. 5A-5C illustrate different viewpoints of an exemplary provider communication device, in accordance with an embodiment of the present techniques.
Figure 5B:
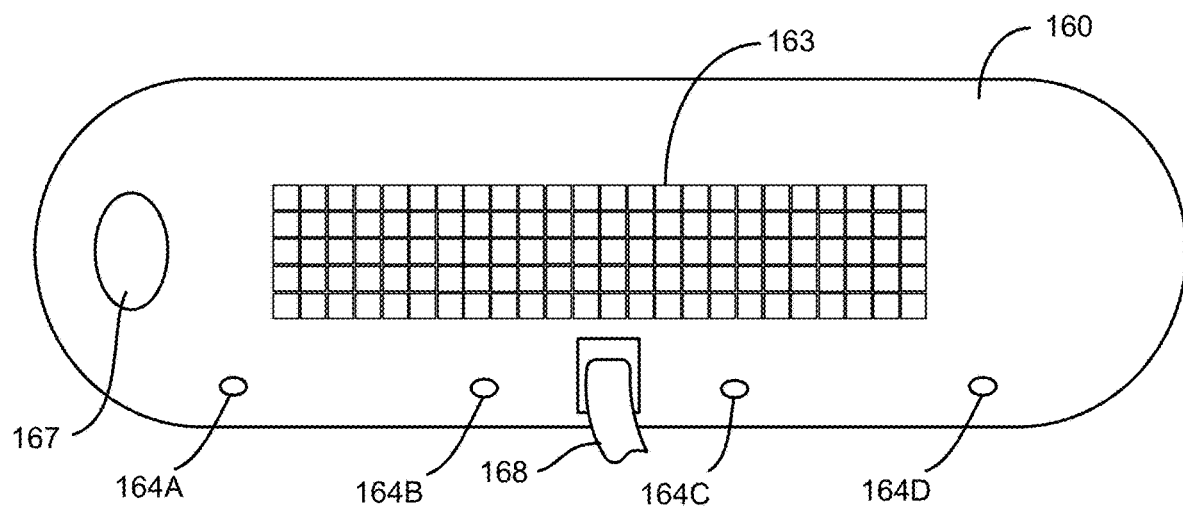
Figure 5C:
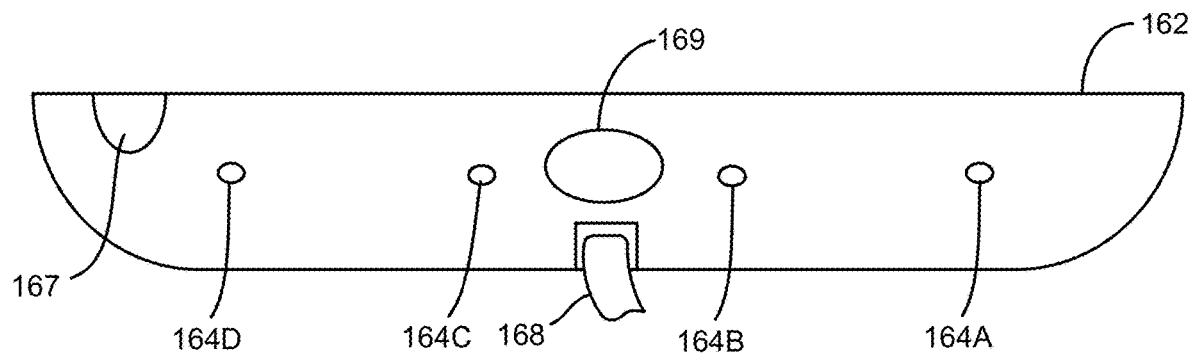

FIGS. 5A-5C illustrate different viewpoints of an exemplary provider communication device 160, according to some embodiments of the present techniques. FIG. 5A shows a front view of the provider communication device 160 having a front display 162 and a logo 165 display. In some embodiments, the logo 165 may have different corresponding lights and/or display elements associated with it such that it can display different colors and/or patterns than the front display. In some embodiments, the logo 165 may have a stable color such that it may not change over time. In some embodiments, the front display 162 may comprise a large number of light sources that can be configured to display a wide range of patterns, colors, images, and/or any other information on the front display of provider communication device 160. For example, the front display may have an array of light emitting diodes (LEDs) that may be configured to provide any number of colors either individually or in combination with the other LEDs in the array. Any suitable lighting sources may be used in the front display. FIG. 5A shows the provider communication device 160 presenting a first pattern 166A on the front display 162 that has a single color being displayed through the display portion of the front display with a lighter colored logo 165 to offset the darker background.

FIG. 5B shows a rear view of the provider communication device 160 having a rear body, a rear display 163, a power button 167, background lighting 164A-164D, and a device input 168. The rear display is configured to display instructions, greetings, directions, proximity indicators, and/or any other suitable information to those in a vehicle and/or behind the vehicle. For instance, the rear display 163 may be configured to instruct a provider with navigation directions to a requestor, may show a greeting to the requestor as they enter the vehicle, may display a proximity indicator to help the provider that arrives in the vehicle to find the exact location of the requestor computing device and/or any other suitable purpose for displaying information to the provider and/or requestor. The rear display 163 may include an array of LEDs and/or any other suitable lighting source that may be capable of displaying multiple colors, patterns, graphics, images, animation, and/or any other perceivable information to a requestor and/or driver. The background lighting 164A-D may include one or more independent light sources that are pointed in a downward direction to allow a cloud of light to fill the dashboard and/or front driving area of the vehicle. The background lighting 164A-D may be separate and distinct colors and/or patterns from the front and rear display and/or may match the pattern and/or colors displayed on the front and/or rear display.

The power button 167 may allow a provider to quickly and easily turn the provider communication device 160 on or off and may have a sleep mode and/or other settings interface for the driver to interact with the provider communication device 160. The device input 168 may include any suitable power input 168 and/or data input 168 to allow one or more other devices and a power supply to be provided to the provider communication device 160. The provider communication device 160 may receive power from an independent battery and/or from a power supply of the vehicle. The data input 168 may allow the provider computing device 150 to send information to the provider communication device 160 and/or the provider communication device 160 may include a wireless communication element that allows the provider computing device 150 to communicate with the provider communication device 160. For example, Bluetooth™ and/or other short range communication protocols may be used to link and/or pair the provider communication device 160 and the provider computing device 150.

FIG. 5C shows a bottom view of the provider communication device 160 showing the background lighting 164A-D, power button 167, and the device input 168. Each of the light sources for the background lighting 164A-D may have separate colors and/or controllers such that each of the independent lights of the background lighting 164A-D may be activated, deactivated, and/or have different colors showing at any given time. For example, if directions are being provided to the driver to take a right turn, the background lighting 164A-D may display a color with a pattern that lights the individual background lighting 164A-D from left to right in a repeating pattern to indicate to the driver that a right turn should be taken. Thus, the proximity indicators may control any and/or all of the various lights in order to provide navigation information to the provider in respect to the location of the requestor. Accordingly, the pattern may begin with the left-most background lighting element 164A display for a half second, followed by the immediately adjacent background light to the right 164B being lit for a half second, and so on until each of the background lights 164A-D are activated and deactivated from left to right to indicate to the driver that a right turn should be made. Additionally, a base sensor 169 may be present that instructs the processor of the provider communication device 160 that a base or stand is present and connected to the provider communication device 160. The sensor may be magnetic such that the stand can easily be attached and detached.

Figure 5D:
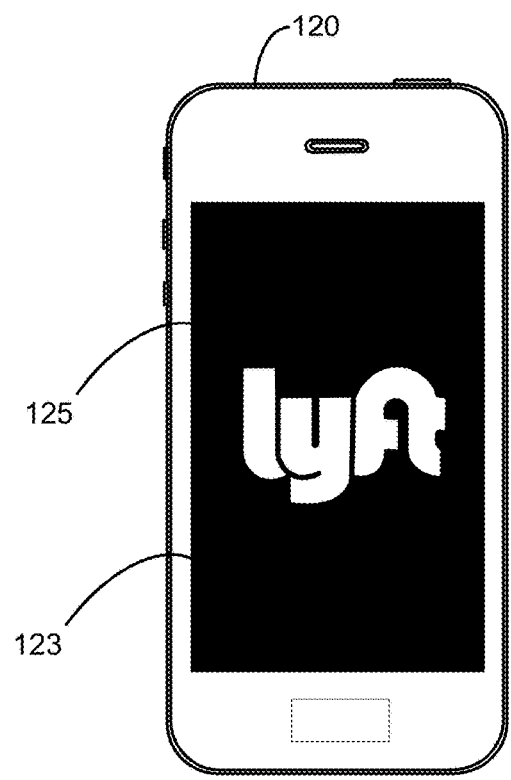
FIG. 5D illustrates an exemplary computing device, in accordance with an embodiment of the present techniques.

FIG. 5D illustrates an exemplary computing device, in accordance with an embodiment of the present techniques. The computing device may be a requestor computing device 120 and/or a provider computing device 150. The computing device includes a display 123 with a pattern 125 being presented on the display 123. The pattern 125 matches the pattern 165 being displayed on the provider communication device 160. In some embodiments, the pattern 125 may be displayed on the requestor computing device 120 and the provider computing device 150 and may match the pattern 166 being displayed on the provider communication device 160 all at the same time so that each party may identify the correctly matched provider and requestor once the provider has found the location of the requestor.

I. Proximity Vector Navigation

Figure 6A:
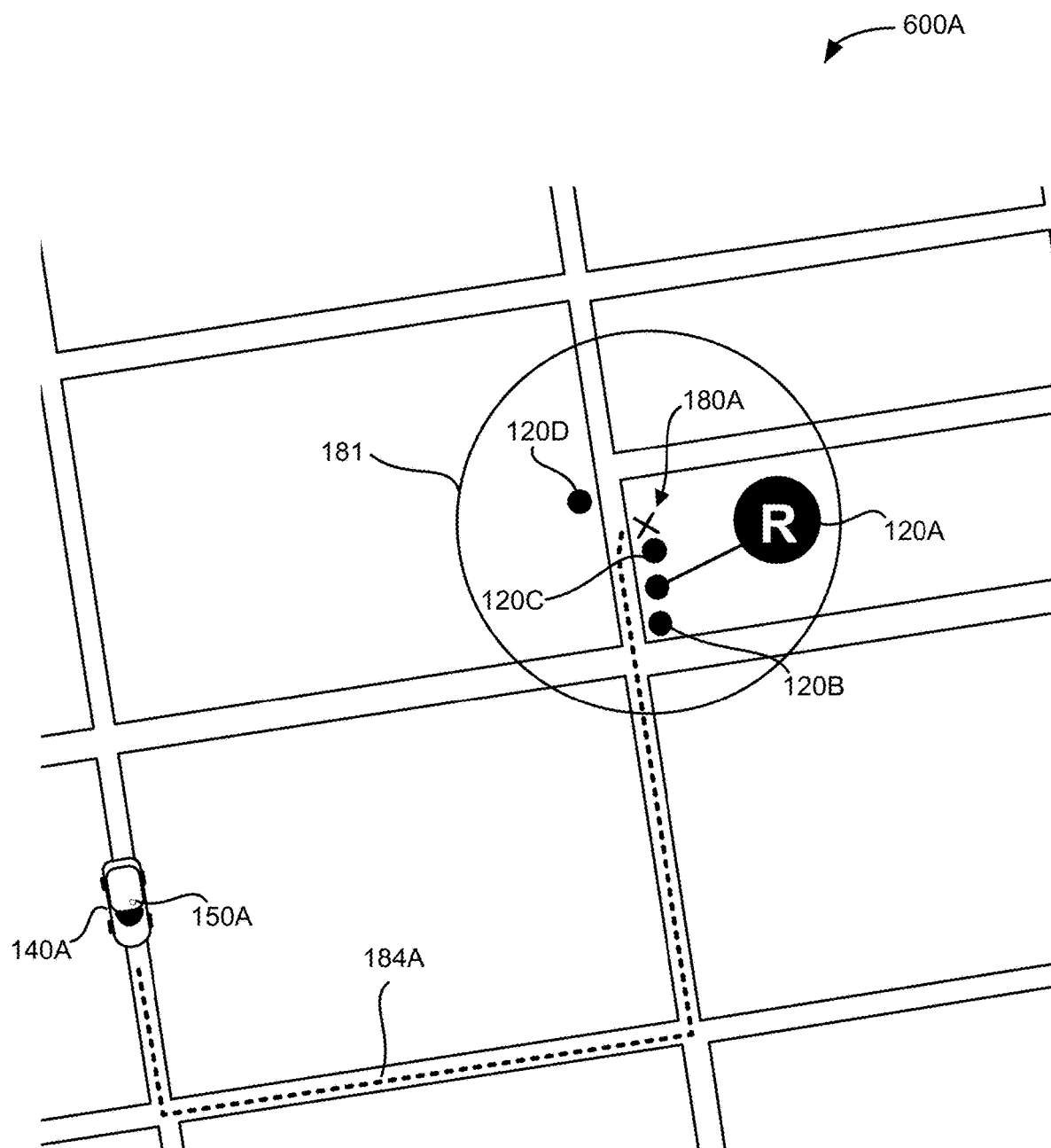
FIGS. 6A and 6B illustrate a provider locating a requestor at a request location amongst a variety of requestors based on a proximity vector between the provider device and the requestor device, in accordance with an embodiment of the present techniques.
Figure 6B:
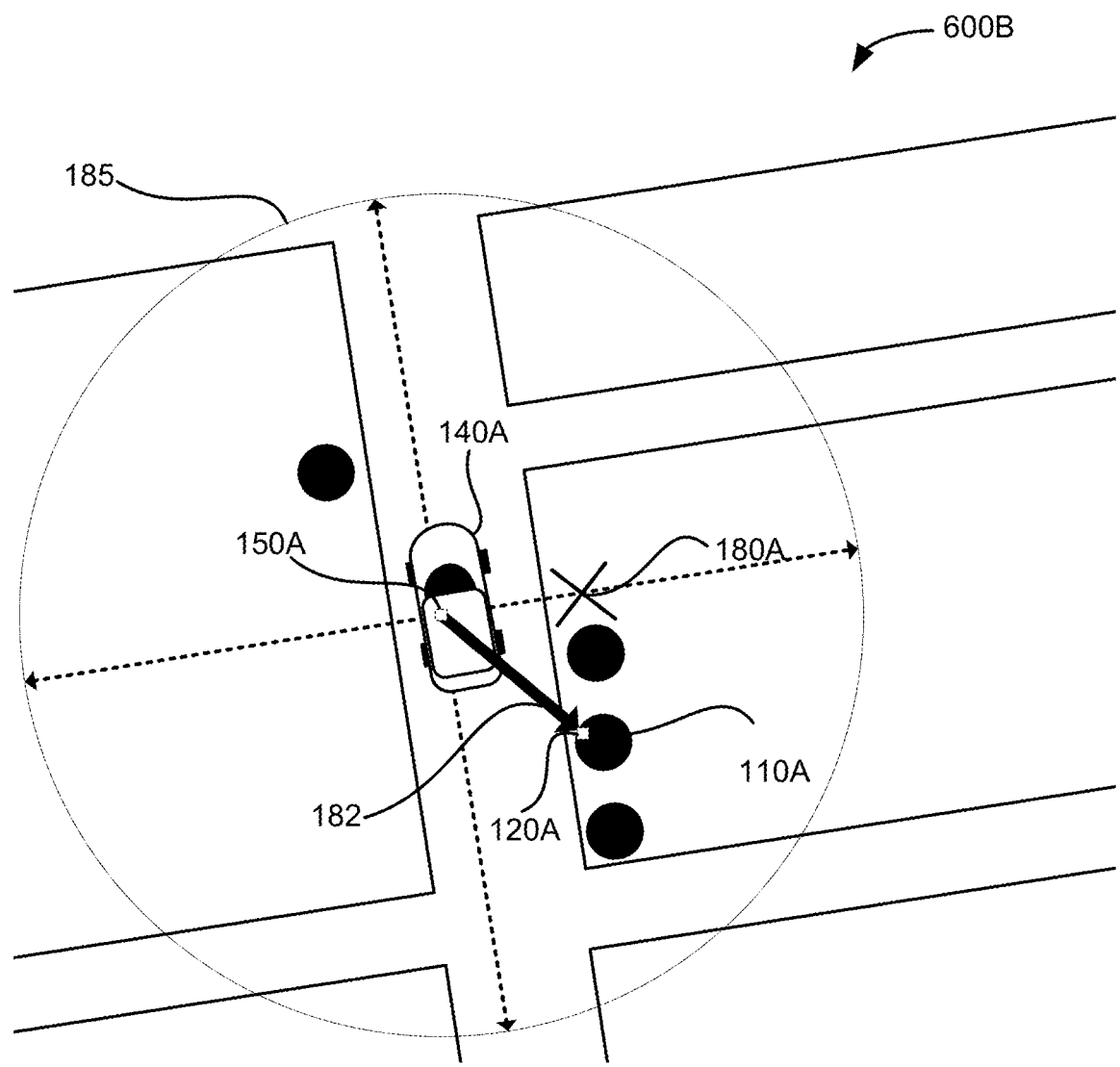
Figure 6C:
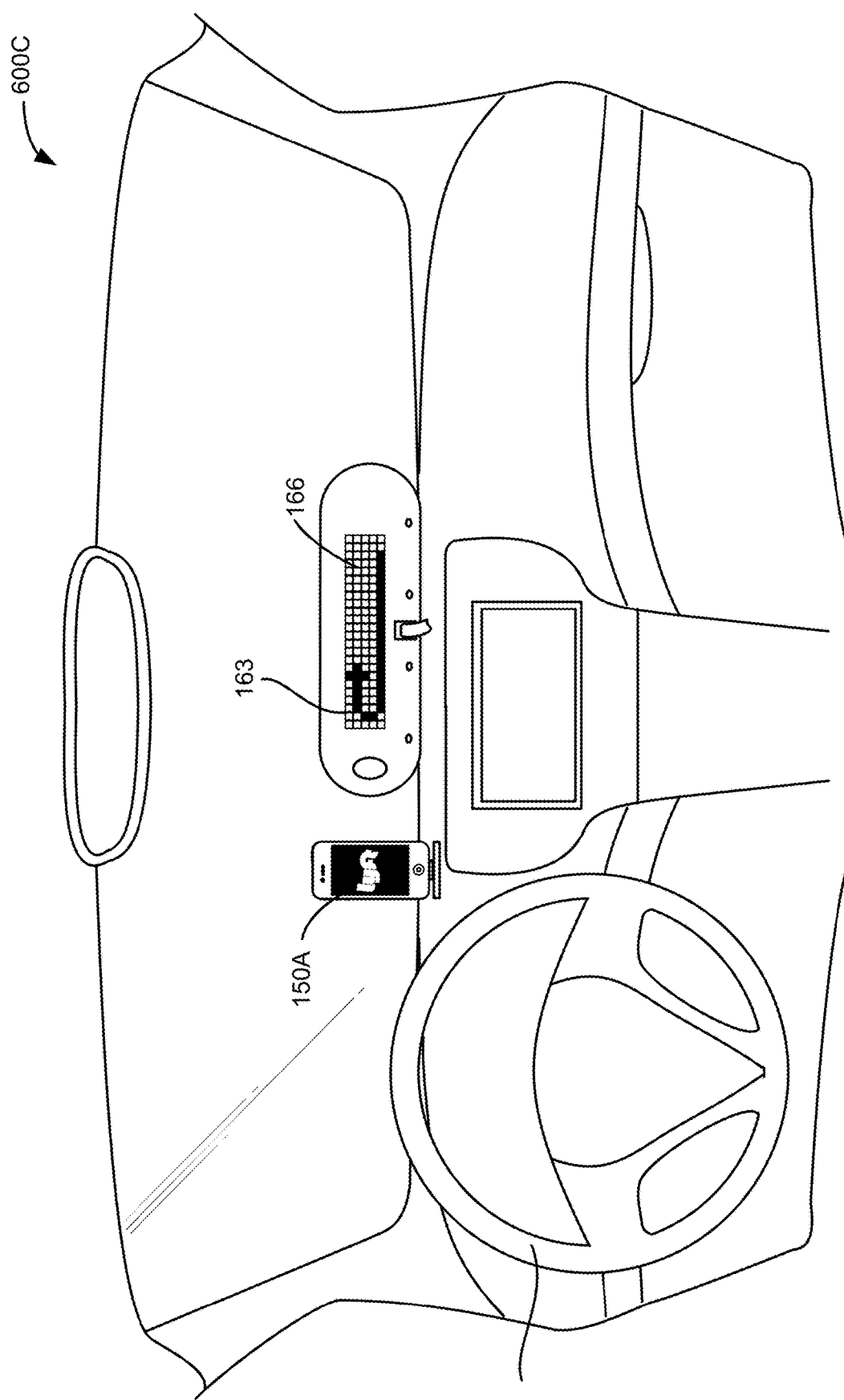
FIG. 6C illustrates an example of an environment from the view point of a provider at a request location, in accordance with an embodiment of the present techniques.

FIGS. 6A-6C illustrate an exemplary method of identifying a location of a requestor computing device upon arrival within a threshold distance of a request location 180A with multiple requestors 120A-120D present. FIG. 6A illustrates a diagram 600A of a provider 140A and multiple requestors 120A-120D that have matched rides within the same area as a request location 180A, in accordance with an embodiment of the present techniques. As discussed previously, in some embodiments, requestor computing device location may only be provided to a provider computing device 150A when the provider computing device 150A is near the request location. As such, some embodiments may identify whether the provider computing device 150A is within a distance threshold 181 of the request location 180A before providing a requestor computing device location to the provider computing device 150A. Thus, the provider 140A may be capable of locating and navigating to the location of the requestor where the requestor 110A (and their corresponding requestor computing device 120A) has moved down the street from the request location and is not the nearest requestor to the request location 126A. Accordingly, FIG. 6A shows an example where a provider 140A may arrive at the request location 180A and may be confused as to which requestor is matched with the provider and/or may have difficulty finding the correct requestor 110A.

In the example shown in FIG. 6A, the ride matching system 130 may receive a ride request from a requestor computing device 120A that includes a request location 180A for a pick-up. The request location may be entered by the requestor or may include the initial location of the requestor computing device upon initiation of the ride request. The ride matching system 130 may identify a provider computing device 150A associated with an available provider in the area, send the ride request to the provider computing device 150A and receive a ride match response from the provider computing device 150A that accepts the ride. The ride matching system 130 may identify a location of the provider computing device 150A and map a navigation route 184A from the location of the provider computing device 150A to the request location 120A. Although not shown in FIG. 6A, there may be other provider computing devices that are matched with the other requestor computing devices located near the request location that may have navigation routes mapped to other request locations near the request location 180A of the requestor computing device 120A.

As can be seen in FIG. 6A, the requestor computing device 120A associated with the ride request is not located at the request location 180A. Instead, the requestor computing device 120A is down the block from the request location and there is another requestor computing device 120C that is closer to the request location 180A. As such, upon arrival near the request location 180A, the provider may not be able to easily find the requestor at the request location 180A. Accordingly, the provider computing device may be configured to calculate a proximity vector and navigate to the requestor as shown in FIG. 6B.

However, in order to conserve system resources, a proximity vector may not be determined and corresponding proximity indicators leading to the requestor computing device may not be presented until the provider computing device is near the request location. As such, the provider computing device may determine whether the device is within a threshold distance to the request location before receiving a requestor computing device location and/or calculating a proximity vector to the location of the requestor computing device. Accordingly, once the provider computing device and/or the ride matching system determines that the provider computing device is within the threshold distance of the request location, the provider computing device and/or ride matching system may determine a proximity vector to the requestor computing device and use the proximity vector to locate the requestor computing device.

The ride matching system 130 and/or the provider computing device 140A may determine whether the provider is within a threshold distance 181 of the request location 180A through any suitable method. For example, in some embodiments, the ride matching system 130 may determine a provider estimated arrival time based on the navigation route and may store that information associated with the matched ride information. The provider estimated arrival time is the estimated arrival time of the provider to arrive at the request location from the current location of the provider computing device. The ride matching system 130 may calculate an estimated arrival time using the distance of the mapped navigation route, road conditions for the mapped navigation route, current and/or historical traffic information for the mapped navigation route, current and/or historical travel time information for the mapped navigation route, weather information, vehicle diagnostic information (e.g., gas level, service light on, flat tire, etc.), and/or any other suitable information. For instance, the ride matching system 130 may determine that with traffic the estimated arrival time for the provider computing device 150A to the pick-up location 126A may be 4 minutes. Accordingly, the ride matching system may determine that the time to reach the distance threshold is 3 minutes 30 seconds and upon that time being met, may send the requestor computing device location for determination of the proximity vector.

Additionally and/or alternatively, the provider computing device may compare the location of the provider computing device and the request location to a threshold distance to identify whether within the distance threshold. For example, the distance threshold may be fifty yards, half a block, or any other suitable distance threshold associated with the pick-up location where a provider may be confused as to the exact location where a requestor is located. Upon the proximity threshold being triggered, the ride matching system may provide the requestor computing device location and continue to update that location information over time until the pick-up is completed. In some embodiments, the provider computing device may send a request for the requestor computing device upon the provider computing device determining that the provider computing device is within the distance threshold to the request location. In other embodiments, the ride matching system may monitor and track the location of the provider computing device in relation to the request location and send the requestor computing device location upon arrival within the distance threshold.

FIG. 6B shows an example diagram 600B of a provider 140A arriving within a threshold distance 181 of the request location 180 and attempting to locate the requestor 110A associated with the matched ride. The provider computing device may receive the requestor computing device location and determine a proximity vector 182 using a difference between a location of the provider computing device 150A and the location of the requestor computing device 120A. The proximity vector 182 may be determined by calculating a magnitude and a direction of the difference between the location of the provider computing device and the location of the requestor computing device. Reference coordinate axes 185 with an origin at the location of the provider computing device may be used to identify the direction and magnitude of the proximity vector. The reference coordinate axis may be defined such that 0 degree reference axis is the direction that the vehicle is facing and/or traveling. For example, as shown in FIG. 6B, the reference coordinate axes 185 may be determined in reference to the front of the vehicle with an origin of the reference coordinate axes 185 present at the location of the provider computing device 150A. As such, in the example shown in FIG. 6B, the direction of the proximity vector may be determined to be between 90 degrees and 180 degrees of the front of the vehicle. An exact direction may be determined, for instance, as 133 degrees. The magnitude may be determined by identifying the hypotenuse of the x and y coordinates of the location of the requestor computing device in reference to the origin of the axes located at the location of the provider computing device. Thus, the magnitude may be calculated using the algorithm $\upsilon=\sqrt{x^2+y^2}$ and the direction may be calculated by taking the inverse tangent of the location y/x in reference to the location of the provider computing device. Accordingly, the direction and magnitude of the vector can be calculated using the x and y coordinates of the requestor computing device in relation to the location of the provider computing device.

Once the proximity vector is determined, the provider computing device 150A may identify a proximity indicator associated with the proximity vector. For example, the provider computing device 150A may determine that the first proximity vector is associated with a particular proximity identifier that corresponds to a graphic that shows the direction in which the provider should navigate in order to find the location of the requestor computing device. FIG. 6C illustrates an example of an environment 600C from the view point of a provider at a request location where the provider communication device is displaying a proximity indicator associated with the proximity vector of the example shown in FIGS. 6A-6B. As shown in FIG. 6C, the provider can quickly and easily determine that the requestor is located behind them by looking at the graphic (i.e., pattern, color, etc.) displayed on the rear display 163 of the provider communication device 160. Accordingly, the provider may navigate to the requestor by turning around, backing up, and/or may flag down the requestor once the location of the requestor is known. Additionally, as the provider arrives near the request location the proximity indicators may start displaying such that the provider may not move past the requestor location as they will get feedback before arriving at the request location and can easily find the requestor upon arrival near the request location.

In some embodiments, the graphics associated with the proximity indicator may be triggered to be presented upon determining that the magnitude of the proximity vector is below a display threshold amount. For example, if the requestor computing device is too far away from the provider computing device to display relevant information to find the requestor, the system may wait to display a relevant proximity indicator until the provider computing device is within a particular display distance threshold of the requestor computing device even if the proximity vector has been determined. Accordingly, in some embodiments, a proximity indicator may not be displayed until the provide is within a threshold distance of the requestor so that the proximity indicators may be helpful in finding the exact location of the requestor computing device. For instance, if the magnitude of the proximity vector indicates that the requestor is over a block away, 100 yards away, and/or over any other relevant display distance threshold, the proximity indicator may not be displayed.

Additionally and/or alternatively, in some embodiments, the proximity indicator may only be displayed upon an event or condition being met. For example, in some embodiments, upon arrival at a request location, the provider may press an arrived button or other input on the provider application 151 of the provider computing device 150 and only upon arrival will the proximity indicators be displayed for navigation to the exact location of the requestor computing device. As such, when the arrival input is received by the provider application 151 of the provider computing device 150, the interactive display module may cause the graphics associated with the proximity indicator to be displayed on the displays of the provider computing device 150 and/or the provider communication device 160.

Figure 7A:
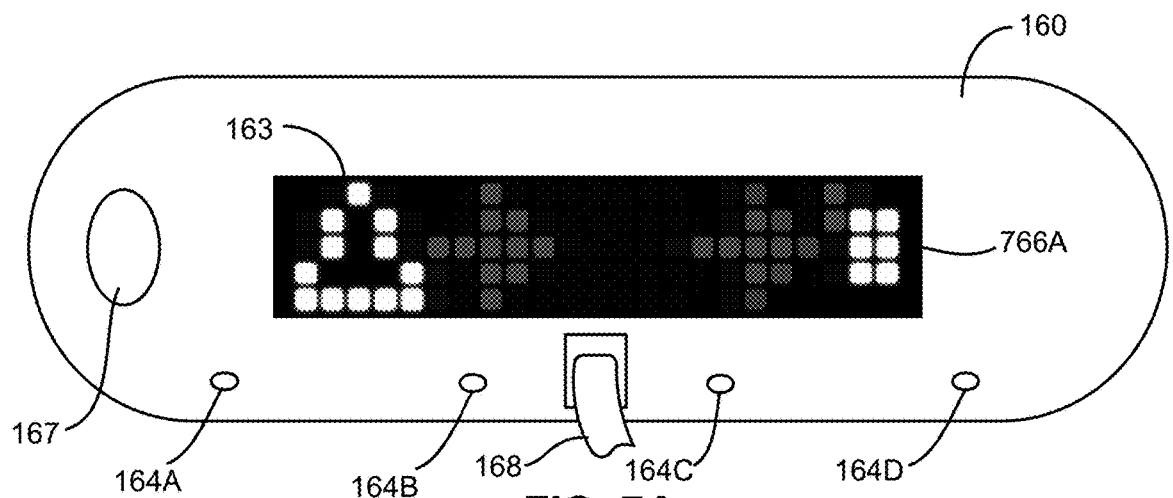
FIGS. 7A-7F illustrate an exemplary provider communication device showing different proximity indicators on a rear display of the provider communication device, in accordance with an embodiment of the present techniques.

FIGS. 7A-7F illustrate an exemplary provider communication device 160 showing different views of an animated proximity indicator 766A-766F on a rear display 163 of the provider communication device 160, in accordance with an embodiment of the present techniques. Proximity indicators may include any suitable format, form, design, and/or information to allow a provider to locate and navigate to a requestor location. In some embodiments, the proximity indicators may include an animation with different phases showing a relative direction and/or proximity to the requestor computing device. In such embodiments, different portions of an animation sequence may be shown for different distances and/or directions to the request location and/or the requestor computing device. For example, FIG. 7A shows a first phase of an animated proximity indicator 766A being presented on a rear display 163 of the provider communication device 160. The first phase of the proximity indicator animation 766A may be associated with the provider computing device traveling toward the request location and may be displayed when the distance between the provider computing device and the request location is over a particular long-distance threshold amount (e.g., 1 mile, 10 blocks, etc.). The first phase of the proximity indicator animation indicates that the provider is traveling toward the requestor.

Figure 7B:
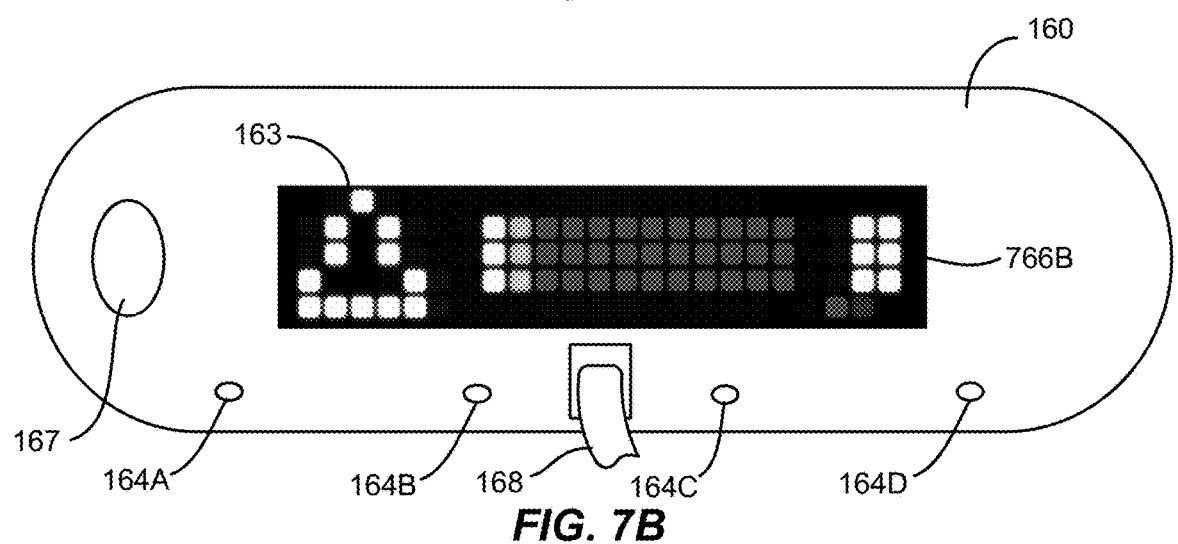
Figure 7C:
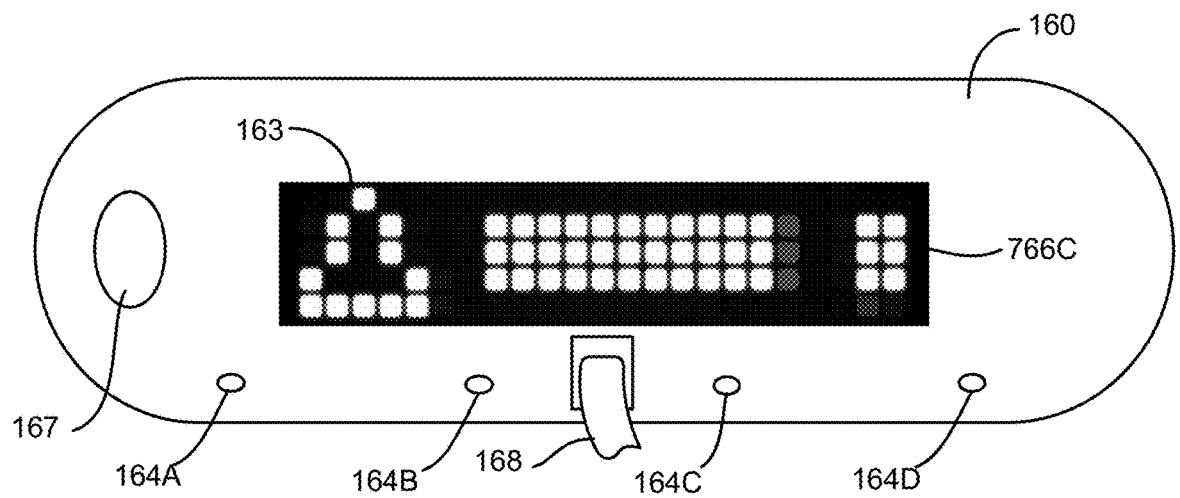

FIG. 7B shows a provider communication device 160 having a second phase of an animated proximity indicator 766B being displayed on the rear display 163 of the provider communication device 160. The second phase of the proximity indicator may be triggered once within the long-distance threshold amount. The second phase of the proximity indicator may set a reference distance to the request location and/or requestor computing device that allows the provider visual feedback regarding how close they are to the location of the requestor computing device and/or request location. For example, the animated display shows a graphical representation of a provider on a left side of the display, a graphical display of a requestor on the right side of the animation, and a reference distance grid in between the provider and the requestor in the middle. As the provider gets closer to the location of the requestor, the visual grid may fill to indicate that the provider is getting closer to the location of the requestor and/or request location. FIG. 7C shows a provider communication device 160 displaying a second phase 766C of the animated proximity indicator where the provider is closer to the requestor than the proximity indicator shown in FIG. 7B. Accordingly, the magnitude of the proximity vector between the provider and the requestor for the proximity vector in FIG. 7C is smaller than that of FIG. 7B. In some embodiments, the second phase of the proximity indicator 766C may be used as the provider is approaching the request location but before they arrive within the distance threshold of the request location to indicate the provider is getting closer but is not within a particular distance of the request location yet. Any other sequence of thresholds distance levels and/or distances may be configured to correspond to the various animated sequence of images displayed by the different phases of the animated proximity indicator.

Figure 7D:
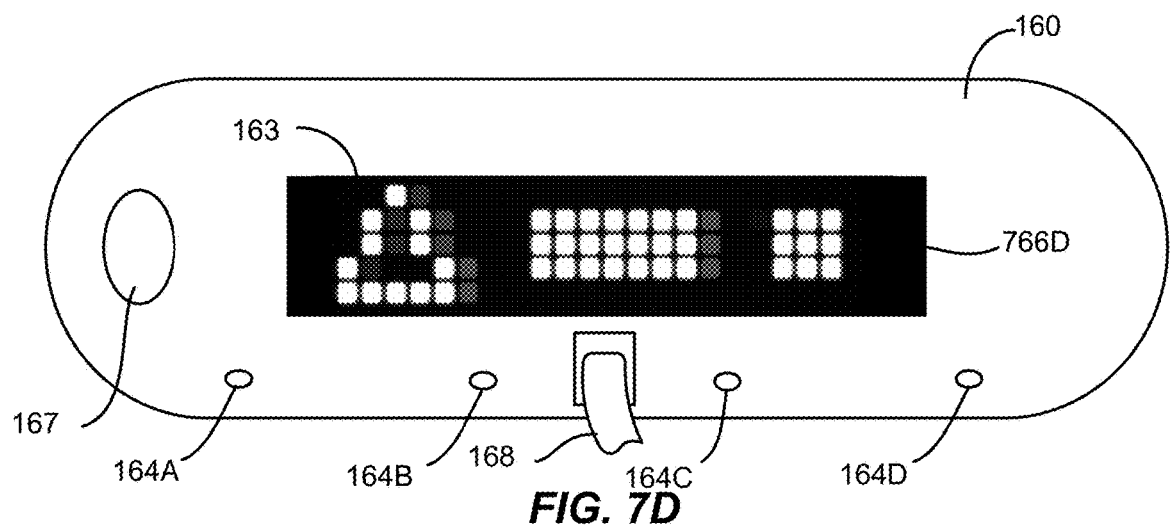
Figure 7E:
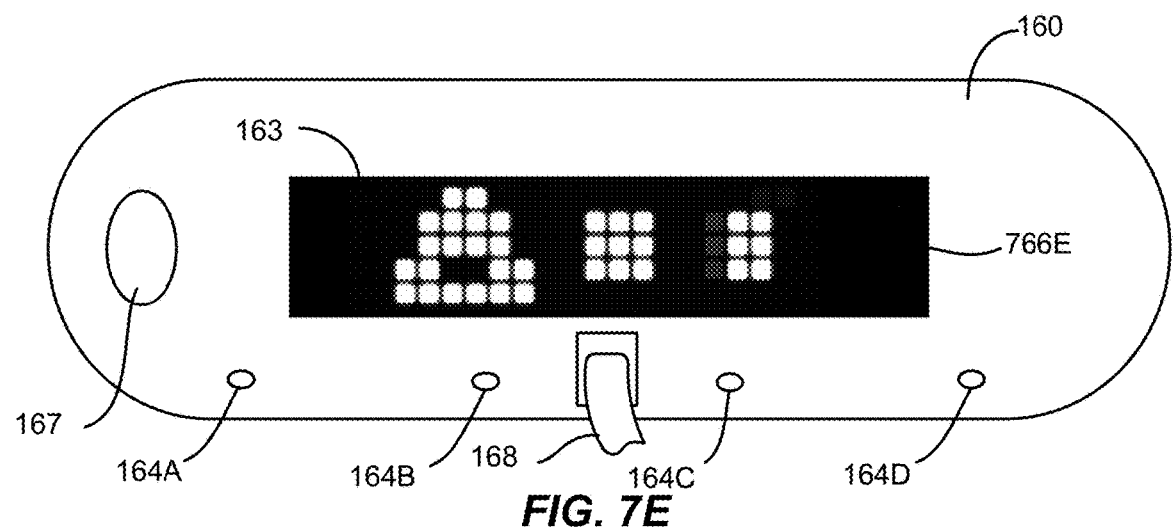
Figure 7F:
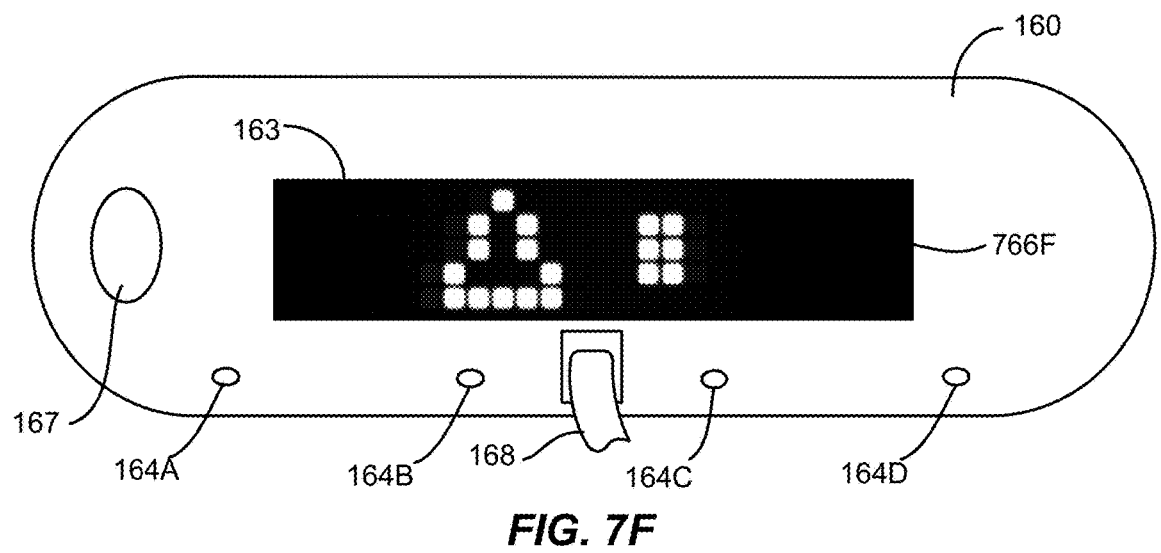

FIG. 7D shows a third phase of the animated proximity indicator 766D where the provider is within the distance threshold of the request location and may be approaching the location of the requestor. Accordingly, the distance grid between the graphical representation of the provider and the requestor has filled completely and starts to get smaller indicating that the distance between the requestor and the provider is getting smaller. Similarly, FIG. 7E shows the third phase of the animated proximity indicator 766E where the provider is even closer to the requestor computing device and/or request location than in FIG. 7D. Once the distance grid shrinks and completely disappears, the proximity indicator is indicating that the provider is at the location of the requestor computing device. FIG. 7F shows the fourth phase of the animated proximity indicator 766F where the distance grid has completely disappeared and the provider is at the request location and/or the requestor computing device location. In some embodiments, the graphical representations of the provider and the requestor in the proximity indicator 766F may flash back and forth to indicate that the locations are matching or are very close and the contact may be made soon between the two parties.

As such, as the magnitude of the proximity vector gets smaller as the provider travels towards the requestor location and/or the request location, an animated proximity vector may be configured to provide feedback to the driver to allow the driver to locate the requestor as efficiently and quickly as possible. In some embodiments, the proximity vector may start between the provider computing device and the request location and may later shift to the distance between the requestor computing device and the provider computing device. Thus, different reference points, locations, distances, and proximity vector magnitudes may be displayed through the animated proximity vector in order to save resources and locate the requestor in the most efficient manner possible without unnecessarily using system resources.

Additionally and/or alternatively, in some embodiments, the proximity indicators may show both direction and distance and may include navigation instructions for finding the requestor computing device location to the provider. For example, FIGS. 8A-8E illustrate different proximity indicators 866A-866E that can be shown on a rear display 163 of a provider communication device 160 and their corresponding proximity vectors 182A-182E, in accordance with an embodiment of the present techniques. FIG. 8A shows a proximity indicator having an arrow indicating the location of the requestor computing device to the provider within the rear display 163 of the provide communication device (not shown). The corresponding proximity vector 182 showing the direction and magnitude of the requestor computing device is shown as well for reference as to how the proximity indicator 866 can be associated with the magnitude and direction of the proximity vector 182. For instance, the width of the arrow may indicate how near or far to the location of the requestor computing device that the provider computing device is. As such, a small width arrow may indicate that the provider is relatively far from the requestor and the arrow may get wider as the provider moves closer to the location of the requestor computing device. Additionally, the direction of the arrow may indicate which direction the requestor computing device is located in to instruct the provider on which side of a street to park and/or in which direction to travel. Accordingly, in some embodiments, the proximity indicator may include information regarding the distance and direction in which the requestor computing device is located. The provider may use this information to navigate to the location of the requestor, even when the requestor is not at the request location. In some embodiments, the proximity indicator may be animated such that the arrows move from left to right and/or get larger and smaller as the provider approaches the requestor location.

Further, some proximity indicators may indicate that the requestor location is behind the provider location. For example, FIGS. 8C-8E show proximity indicators with arrows that have a turn associated with them to indicate that the requestor is located behind the provider. Further, the width of the tail end or the pointed end of the arrow may indicate how near or far behind the provider the requestor is located. For instance, how far behind the provider that the requestor is located can be indicated as part of the tail portion of the arrow. For example, as shown in the difference between FIGS. 8C and 8D, the direction of the requestor location in the rear direction may be indicated by the width of the tail of the proximity indicator arrow. For instance, the width of the tail end of the backwards arrow in FIG. 8D is much wider than the tail end of the proximity indicator of FIG. 8C because the requestor is located at a closer location as far as the direction of the proximity indicator in FIG. 8D. As can be seen in FIG. 8E, where the requestor is located close behind the provider, the tail portion and the pointed portion of the arrow may be fat to indicate the distance is small both behind and in direction to the requestor. Accordingly, in some embodiments, the proximity indicators may include multiple levels of information in an intuitive and predictable manner for a provider to interpret.

The rear display may include any suitable display element to generate the proximity indicator. For example, the rear display may include a LCD display that may generate the proximity indicator by using a mixture of light and dark pixels on the rear display. Any other suitable display technology may be used including rear projection, an array of LEDs, etc. Additional proximity indicators may include different patterns, color regions, horizontal lines, vertical lines, and/or any other suitable combinations of light that may indicate directions and/or relative distance to a provider and/or requestor. The proximity indicators may be generated through combinations of physical elements (a rear display cover) and background lighting or through a combination of dark and light pixels on a single display (e.g., LCD display). Patterns may also be projected onto a surface and/or may be provided through an augmented reality (AR) view provided through the computing devices. The proximity indicators shown herein are merely examples of some indicators that can be generated and displayed in some embodiments and the proximity indicators are not limited to those shown. For instance, in some embodiments, proximity indicators may include stripes, dark horizontal lines of different color, images, icons, brands, graphics, animations, etc.

Figure 9:
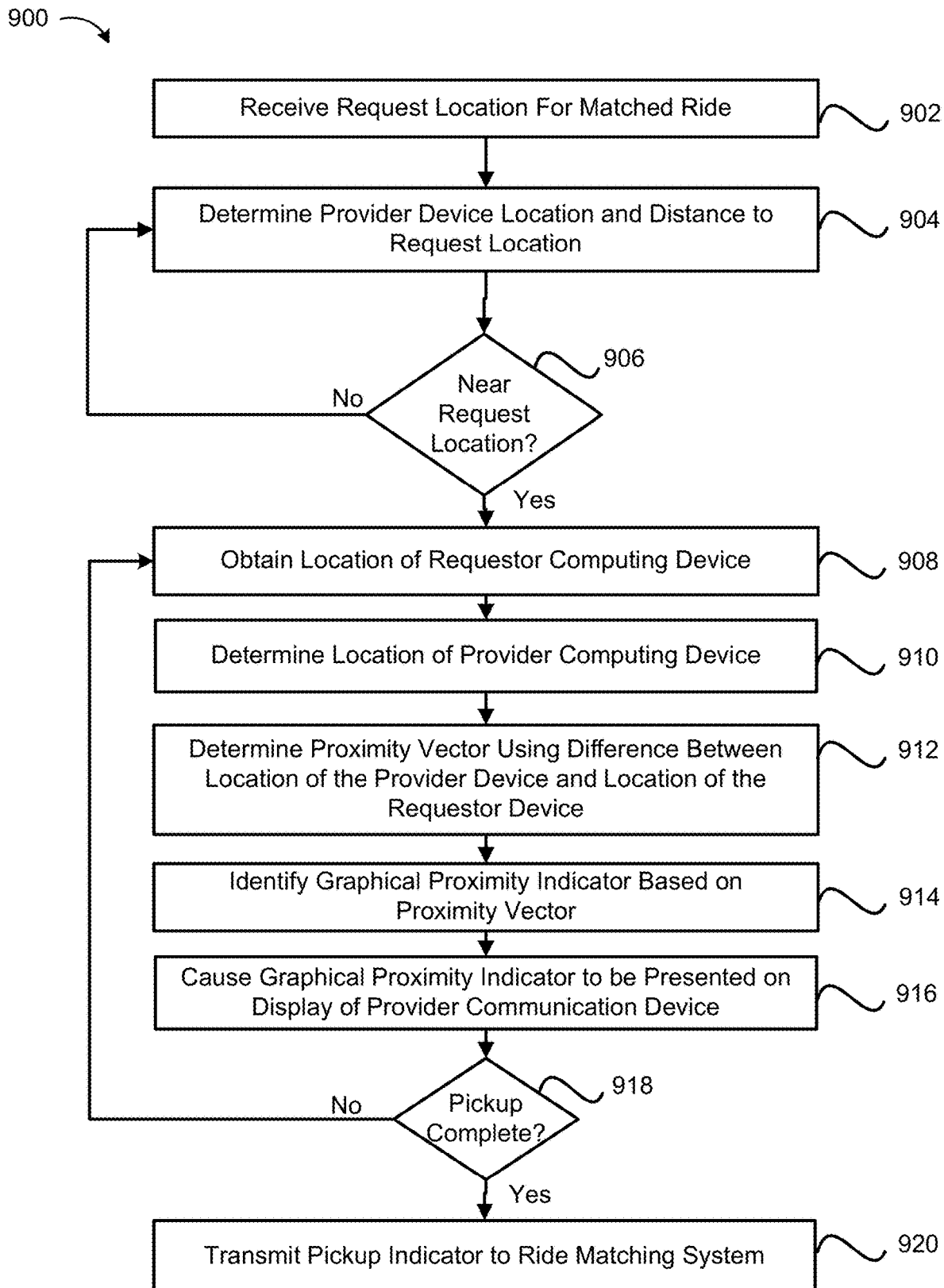
FIG. 9 illustrates an exemplary flow diagram of a method for locating and navigating to the location of a requestor based on proximity between a requestor device and provider device, in accordance with embodiments of the present techniques.

FIG. 9 illustrates an exemplary flow diagram 900 of a method for locating and navigating to the location of a requestor based on a proximity between a requestor device and provider device, in accordance with embodiments of the present techniques. At step 902, the provider computing device receives a ride request from a requestor computing device. The ride request may include a request location (i.e., pick-up location) for the ride request, a requestor identifier, a requestor computing device location, and/or any other relevant information associated with the ride request and/or requestor. The ride matching system may send the ride request to an available provider that is near the request location and may send the ride request to the provider computing device. The ride request may include the request location, requestor information, and/or any other relevant information to allow the provider to identify whether they want to accept or decline the ride request. The ride matching system may identify the provider by determining which provider is closest to the request location, has the highest likelihood of accepting the ride request, and/or through any other suitable method. The provider may review the ride request, accept the request, and send a ride response including an indicator that the provider accepts the ride request. The provider computing device may receive or generate a navigation route to the request location and may start to travel toward the request location.

At step 904, the provider computing device may determine the location of the provider computing device and may determine a distance to the request location. The provider computing device may obtain the location using GPS components and/or other location service components of the provider computing device. The provider computing device may use a navigation route including traffic information, road closures, and road conditions to determine a distance to the request location. For example, the provider computing device may determine that the provider is 2 blocks away, 3 minutes away, half a mile away, and/or any other measure of distance or arrival time from the request location.

At step 906, the provider computing device determines whether the provider computing device is near the request location by comparing the determined distance to the request location to a threshold distance. The threshold distance may be preconfigured based on the geographic location, city, region, provider profile information, and/or any other conditions associated with the matched ride. For example, different drivers may have different threshold distances based on profile settings they have configured. Additionally, different geographic regions may have different navigation settings based on local preferences of providers. For instance, the threshold distance may include 1 block, 100 yards, and/or 1 minute. If the provider computing device determines that the provider is not near the request location by being within the threshold distance, the provider computing device updates the location of the provider computing device and determines a new distance to the request location (step 904). This process continues until the provider computing device is within the threshold distance and thus is near the request location.

At step 908, the provider computing device determines that the provider is near the request location and obtains a location of the requestor computing device from the ride matching system. The provider computing device may obtain the location of the requestor computing device from the ride matching system through any suitable method. For example, the provider computing device may request the location from the ride matching system and/or the ride matching system may identify that the provider computing device is within the distance threshold while monitoring the locations of the provider computing device and send the location of the requestor computing device to the provider computing device. Either way, the provider computing device determines the location of the requestor computing device. The location may be provided in any suitable format including longitudinal and latitudinal coordinates, an address, a proprietary mapping reference location, etc.

At step 910, the provider computing device determines a location of the provider computing device. For example, the provider computing device may obtain the location from a GPS transceiver or other location determination components. For instance, the provider computing device may obtain a set of coordinates for the provider computing device in longitude and latitude coordinates, may receive a set of coordinates based on a reference map of the city, and/or any other objective location that can be referenced to the received requestor computing device location. The location information for both the requestor computing device and the provider computing device may be in the same format and/or the locations may be converted to the same format if received in different formats. For instance, if the GPS receiver provides locations in a different format than the ride matching system, the provider computing device may convert the location information received from the GPS transceiver into the appropriate format to be compared to location received from the ride matching system.

At step 912, the provider computing device determines a proximity vector using a difference between the location of the provider computing device and the location of the requestor computing device. The provider computing device may determine the proximity vector by calculating a magnitude and a direction of the difference between the location of the provider computing device and the location of the requestor computing device. For example, the provider computing device may use the location of the provider computing device as an origin of a set of a reference axes and may identify the difference in location to the location of the requestor computing device based on the set of reference axes. The provider computing device may map the difference using reference axes based on the direction of travel of the provider computing device and calculate a magnitude by determining a hypotenuse of the x and y coordinates of the difference to the location of the requestor computing device. Further, the direction may be identified by taking the arctangent of the coordinates on the reference axes based on the difference between the location of the requestor computing device and the location of the provider computing device.

At step 914, the provider computing device identifies a graphical proximity indicator associated with the proximity vector from a set of proximity indicators stored within the provider computing device. For example, the provider computing device may select a proximity indicator from a proximity indicator data store that is associated with the magnitude and the direction of the difference between the location of the provider computing device and the location of the requestor computing device. The proximity indicators may be grouped for a set of multiple different proximity vectors that have similar magnitudes and directions such that a smaller number of proximity indicators may be stored than possible proximity vectors. Additionally, different types of proximity indicators may be stored by the provider computing device such that the proximity indicators may show distance, direction, and/or both direction and distance to the requestor computing device location. The type of proximity indicator may be selected based on a profile of the provider, local, regional, and/or state-based preferences, and/or through any other suitable conditions.

At step 916, the provider computing device presents the proximity indicator on a display associated with the provider computing device. For example, the provider computing device may cause the graphical proximity indicator that is selected for the proximity vector to be presented on a rear display of a provider communication device to easily and safely allow the provider to navigate to the location of the requestor computing device. As described above, in some embodiments, the timing of the presentation of the proximity indicator may be dependent upon a distance to the requestor and/or a condition being met (e.g., arrival at the request location, etc.). Additionally and/or alternatively, as discussed above, instead of, or in addition to, a proximity indicator being presented, an interaction indicator may be displayed. For example, requestor information including a name, a graphic, a greeting, and/or any other requestor information or provider information associated with the profiles of the provider or requestor may be presented to greeting the requestor as they approach the vehicle. As such, as the provider approaches the location of the requestor computing device, an interaction indicator may be displayed and/or presented on one or more displays associated with the provider computing device. The interaction indicator may include any requestor information or provider information as well as any other relevant information to a matched ride that is stored or accessible by the dynamic transportation matching system or the device displaying the indicator.

At step 918, the provider computing device determines whether the pickup has been completed. The provider computing device may determine whether the pickup is complete through any suitable method. For example, the provider computing device may determine whether the location of the provider computing device and the requestor computing device are in the same location (i.e., within the same vehicle). Additionally and/or alternatively, the provider computing device may receive an input from the provider indicating that the requestor has arrived at the provider or entered the vehicle. Additionally and/or alternatively, the provider computing device may receive a notification from the ride matching system showing that the requestor has indicated that they have been picked up. If the provider computing device determines that the pick-up has not been completed, the provider computing device repeats steps 908-916 and displays graphics associated with additional proximity indicators until a pick-up indicator has been received and/or until the provider application identifies that a pick-up has been completed. Thus, the provider computing device obtains an updated location for the requestor computing device, an updated location for the provider computing device, determines a second proximity vector, and presents a second proximity indicator associated with the second proximity vector to the provider to locate the requestor computing device. As such, as the provider gets closer to the requestor computing device, the proximity indicator that is presented changes to better locate the location of the requestor computing device until the requestor is picked-up and the ride starts.

At step 920, the provider computing device determines that the pick-up is completed and sends a pick-up indicator to the ride matching system to indicate that the matched ride has begun. At this point the requestor is in the vehicle or the on-demand service has otherwise begun and the ride matching system tracks the status associated with the ride and the provider may travel to the destination location associated with the matched ride.

Note that although the present example focuses on on-demand ride-sharing applications, any suitable service may be performed using similar functionality. For example, delivery of services may have a similar process implemented to find the location of delivery of the service. Moreover, note that the functionality described herein may be performed on a requestor computing device at the same time or independent of the provider computing device to allow the requestor computing device to navigate to the location of the provider computing device.

II. Requestor Sequence Identification and Presentation

Figure 10:
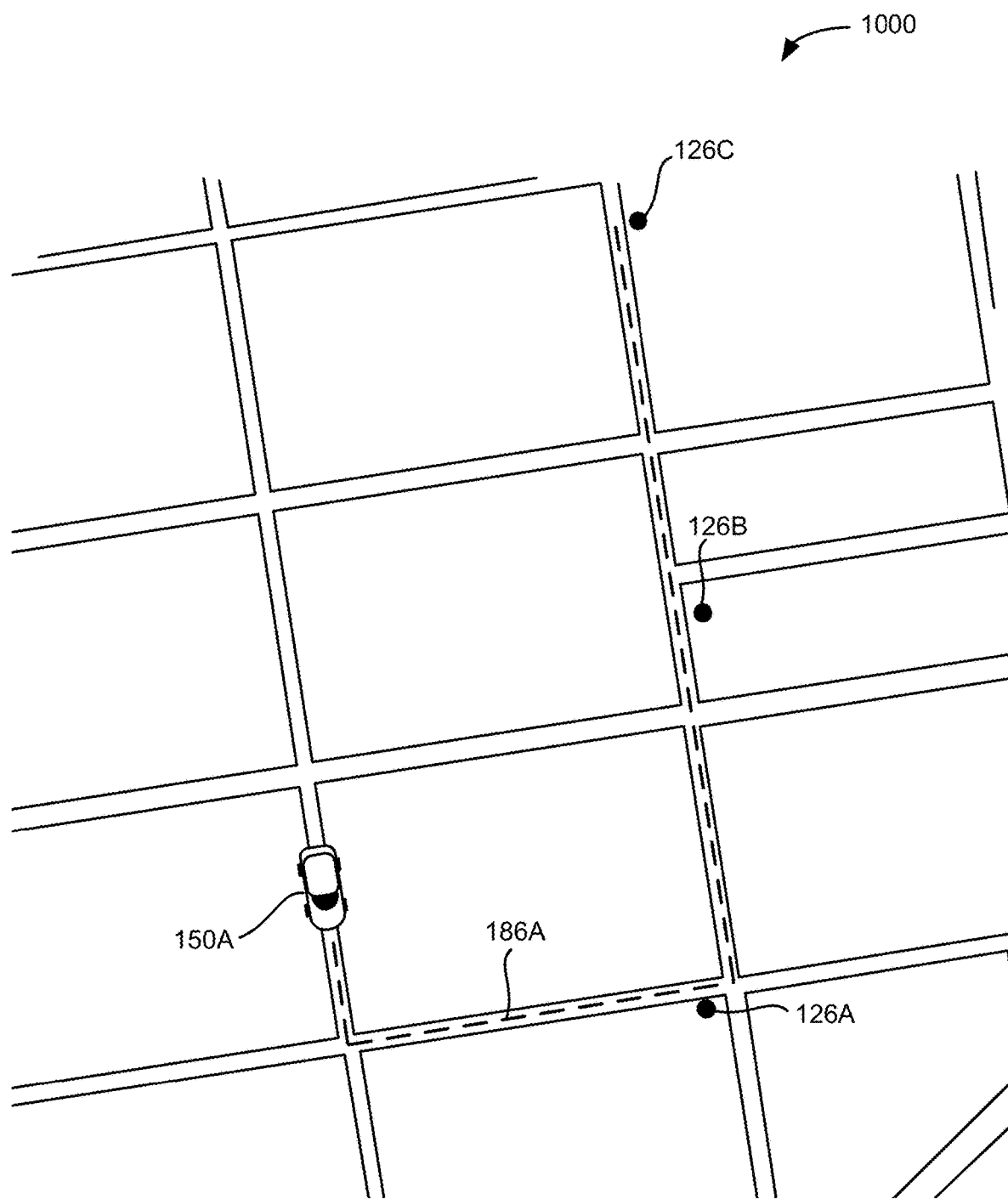
FIG. 10 illustrates a diagram of multiple destinations associated with a requestor information sequence during a ride, in accordance with embodiments of the present techniques.

FIG. 10 illustrates a diagram 1000 of multiple destinations associated with a requestor information sequence during a matched ride, in accordance with an embodiment of the present techniques. In some embodiments, multiple requestors may be matched with a provider and may be provided a ride to multiple destination locations during the same ride. As such, FIG. 10 shows an example where one provider is associated with three requestors that are being dropped-off at three different destination locations 126A-126C during a ride.

In the example shown in FIG. 10, the ride matching system 130 may identify a ride that has one or more requestors in an active ride with multiple destination locations. The ride matching system may identify destination locations that each of the picked up requestors are traveling to. The ride matching system may map a variety of different navigation routes to identify the fastest and/or most efficient route to each of the destination locations. The sequence of destination locations may be determined based on the different navigation routes. The ride matching system may generate a variety of different potential navigation routes incorporating traffic, weather conditions, road conditions, etc. in order to identify the best route and destination sequence to use. Once the most efficient and/or fastest navigation route for the plurality of destination locations is determined, the ride matching system may provide the selected navigation route to the provider computing device. The provider computing device may obtain the navigation route and may start to travel along the navigation route toward the first destination location based on the destination sequence identified by the ride matching system.

However, the multiple requestors may not know which requestor is next to be dropped-off because each requestor may not know the destinations of the other requestors and/or how close the provider is to each of those destination locations. Accordingly, embodiments may implement a requestor information sequence that may be used to present requestor information to the requestors present in the provider vehicle to inform each provider of which requestor and/or destination location the provider is traveling toward.

Figure 11A:
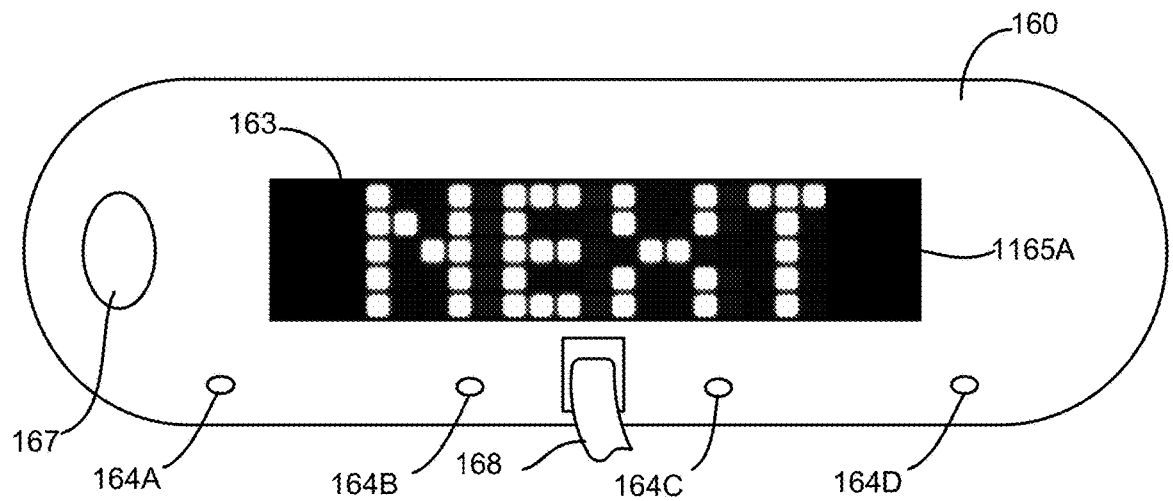
FIGS. 11A-11C illustrate an exemplary provider communication device showing an animation including requestor information based on a requestor information sequence in accordance with embodiments of the present techniques.
Figure 11B:
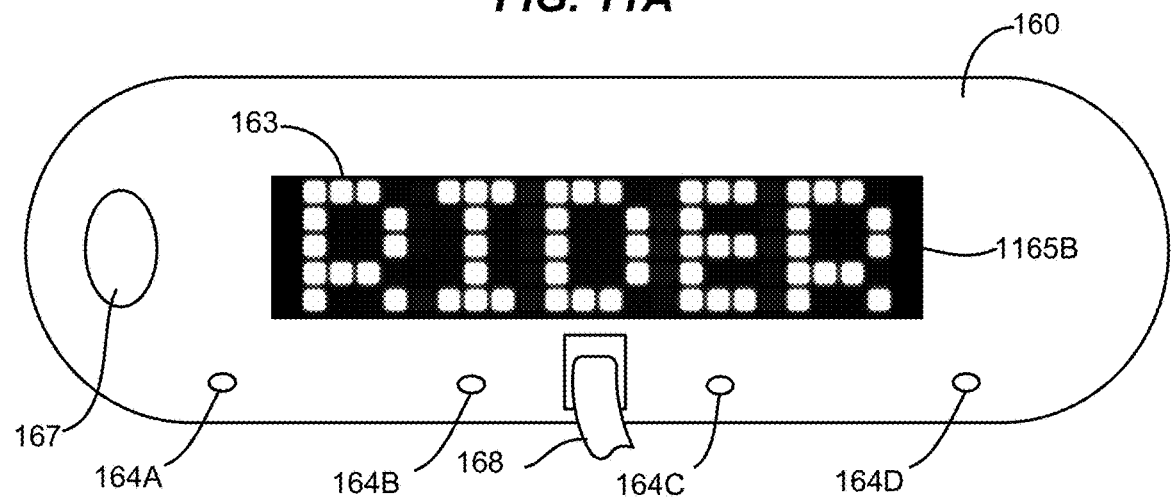
Figure 11C:
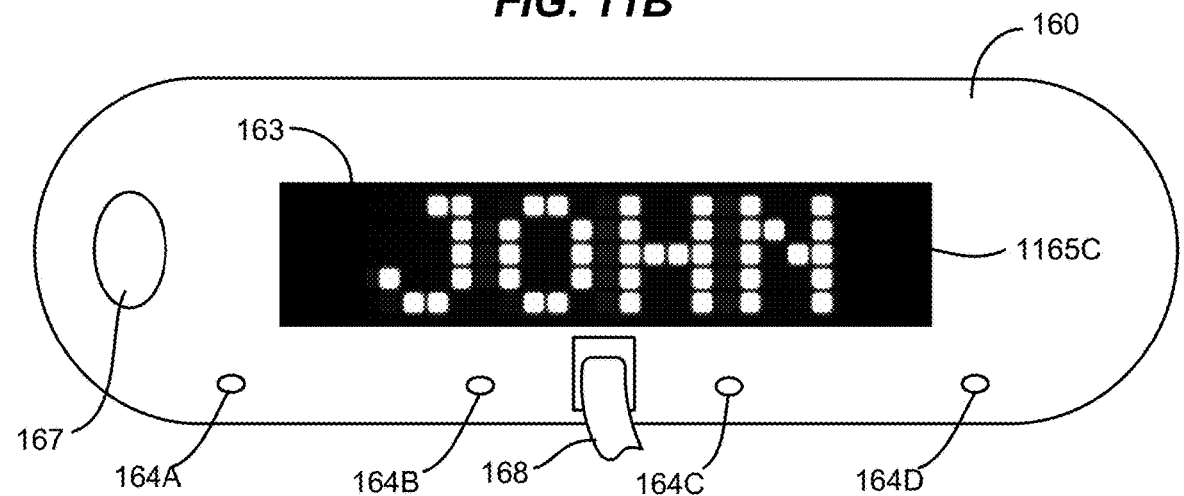

FIGS. 11A-11C illustrate an exemplary provider communication device showing an animation including requestor information based on a requestor information sequence in accordance with embodiments of the present techniques. For example, FIGS. 11A-11C show a rear display 163 of a provider communication device 160 displaying different portions of an animation 1166 including requestor information. FIGS. 11A-11C show three different phases 1165A-1165C of an animation 1165 that informs the requestors in the vehicle of the next destination location that is going to be associated with a particular requestor. For instance, the animation across the three phases may state "Next Rider John" where the requestor information includes the requestor's first name, e.g., "John." The animation message including "Next Rider" may be the same for all requestors but the animation may incorporate the requestor information for the last portion or phase of the animation. Additionally, any number of different animations may also be presented with any number of different messages, videos, sounds, images, etc. Moreover, any number of different requestor information may be used. For example, the requestor information may include a destination address, a picture, an image, a pattern, a color, a video, or a gif selected by the various requestors and stored in their profile information in the requestor information data store. The animation may scroll across the screen in any direction, may flash, and/or may perform any other suitable action to get the attention of the requestors and let them know which requestor destination is associated with the next destination.

Figure 12:
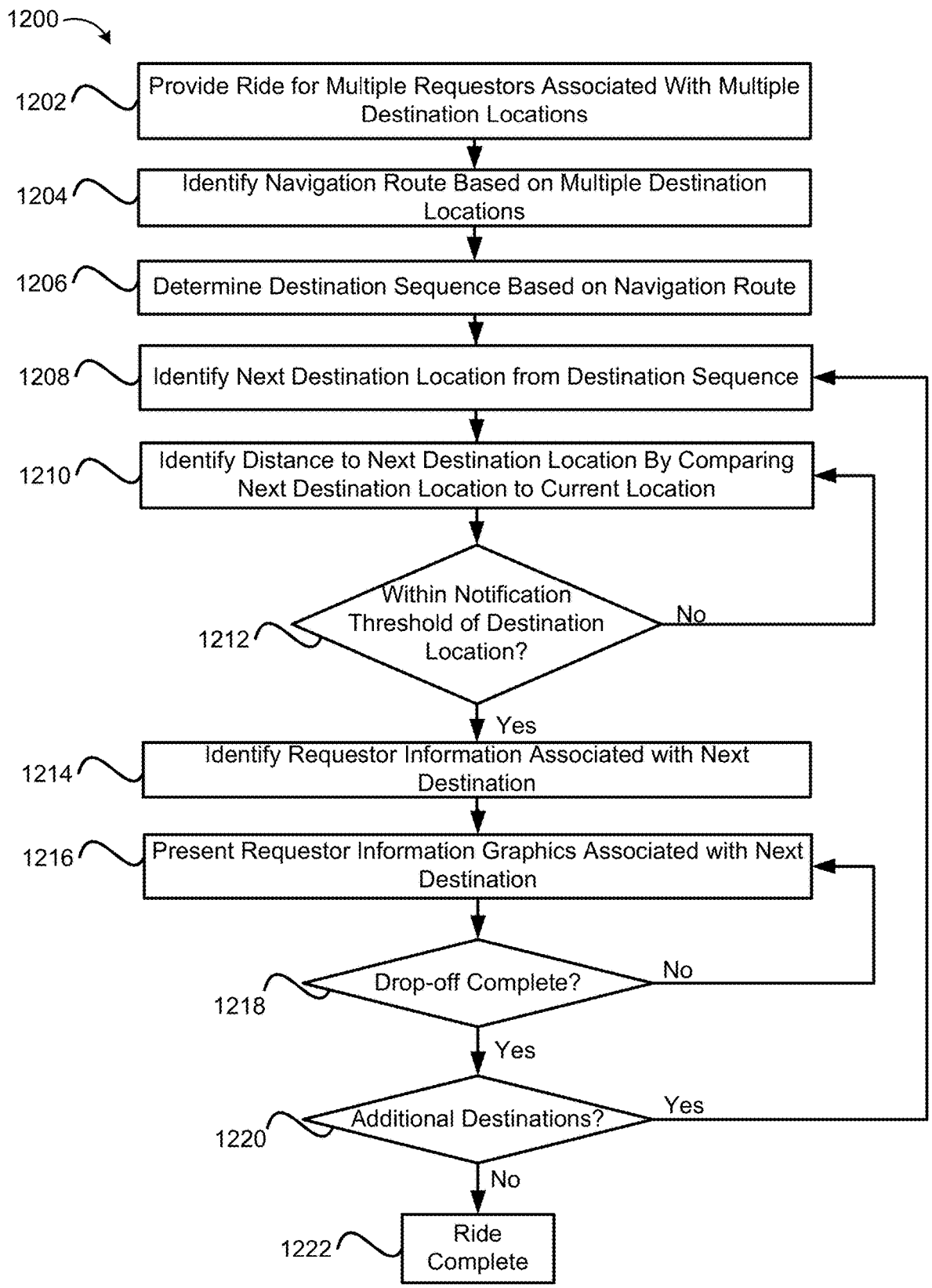
FIG. 12 illustrates an exemplary flow diagram of a method for identifying and presenting requestor information during a ride based on respective destination locations of the requestors, in accordance with an embodiment of the present techniques.

FIG. 12 illustrates an exemplary flow diagram 1200 of a method for identifying and presenting a requestor information sequence during a ride based on respective destination locations of the requestors, in accordance with an embodiment of the present techniques. At step 1202, the provider computing device receives rides requests for multiple requestors and provides a matched ride for more than one requestor at a time. Thus, the provider provides a ride for multiple requestors at the same time using the same vehicle. The provider computing device identifies a navigation route based on the multiple destination locations (step 1204) and starts to travel along the navigation route associated with the multiple destination locations.

At step 1206, the provider computing device determines a destination sequence based on the navigation route that identifies the destination locations and corresponding requestor information for each destination location based on the sequence of drop-offs using the navigation route. The provider computing device may receive the destination sequence from the ride matching system and/or may determine the destination sequence based on the navigation route and the various destination locations. At step 1208, the provider computing device identifies the next destination location from the destination sequence.

At step 1210, the provider computing device identifies a distance to the next destination location by comparing the next destination location to the current location of the provider computing device. The provider computing device may use the navigation route and traffic information, road conditions, weather conditions, etc., in determining the distance to the next destination location.

At step 1212, the provider computing device may determine whether the distance to the next destination is within a notification threshold. If not, the distance determination step of 1210 may be repeated until the provider computing device is within the notification threshold. The notification threshold may include any suitable time or distance including, for example, 2 blocks, ½ mile, 2 minutes, etc.

At step 1214, the provider computing device identifies the requestor information associated with the next destination location. For instance, the provider computing device may determine first requestor information associated with the first destination of the destination sequence and may obtain the requestor information from the destination sequence stored on the provider computing device. The destination sequence may be provided as part of the matched ride information received from the ride matching system upon determination that the provider is matched with multiple requestors.

At step 1216, the provider computing device presents the requestor information on a display associated with the provider computing device. For example, the provider computing device may cause the requestor information to be presented on a rear display of a provider communication device as shown in FIG. 11. The requestor information may be displayed as part of a larger animation and/or may include any suitable information to indicate to a requestor that they are next to be dropped-off. For instance, the requestor information may include a name, image, destination address, and/or any other information to indicate to a requestor they are next to be dropped off. The requestors may be able to customize and/or select their requestor information as part of their requestor profile.

At step 1218, the provider computing device determines whether the drop-off is completed and if so, stops presenting the graphics associated with the requestor information. The ride matching system may update the respective data stores with the completed ride information and the accounts for the requestor and the provider may be updated according to the ride information that was tracked during the matched ride. If the drop-off is not completed, the requestor information is continued to be presented informing the requestor that their drop-off is next and/or that they are within a certain distance of the drop-off.

At step 1220, the provider computing device determines if there are additional destinations and if so, repeats the process from step 1208-1218 for the next destination and/or requestor in the destination sequence. This process continues until all the requestors are dropped-off and/or if there is only a single requestor left in the vehicle. Once there are no additional destinations, the ride is completed (step 1222) and no additional requestor information is displayed.

Figure 13:
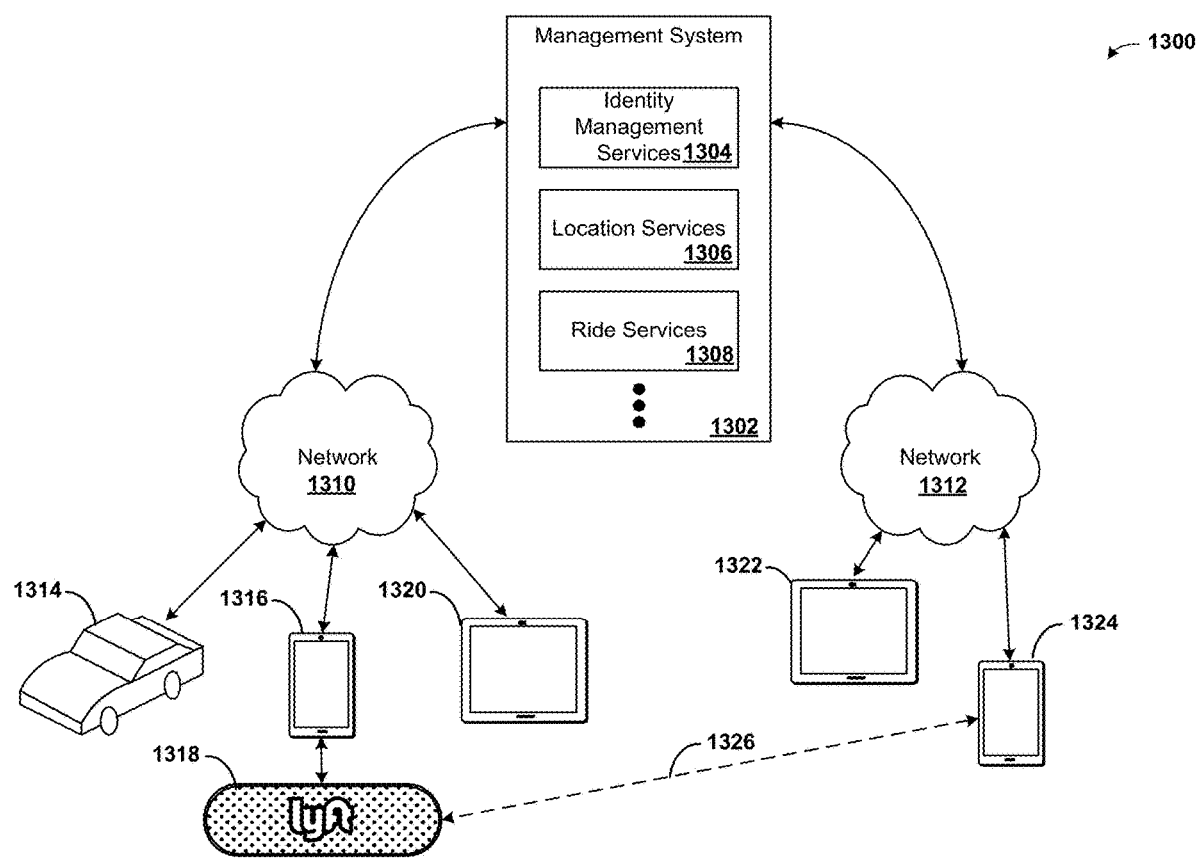
FIG. 13 illustrates an example requestor/provider management environment, in accordance with various embodiments.

FIG. 13 shows a requestor/provider management environment 1300, in accordance with various embodiments. As shown in FIG. 13, a management system 1302 can be configured to provide various services to requestor and provider devices. Management system 1302 can run one or more services or software applications, including identity management services 1304, location services 1306, ride services 1308, or other services. Although three services are shown as being provided by management system 1302, more or fewer services may be provided in various implementations. In various embodiments, management system 1302 may include one or more general purpose computers, server computers, clustered computing systems, cloud-based computing systems, or any other computing systems or arrangements of computing systems. Management system 1302 may be configured to run any or all of the services and/or software applications described with respect to various embodiments of the present techniques described herein. In some embodiments, management system 1302 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 1304 may include various identity services, such as access management and authorization services for requestors and providers when interacting with management system 1302. This may include, e.g., authenticating the identity of providers and determining that the providers are authorized to provide services through management system 1302. Similarly, requestors' identities may be authenticated to determine whether the requestor is authorized to receive the requested services through management system 1302. Identity management services 1304 may also control access to provider and requestor data maintained by management system 1302, such as driving and/or ride histories, personal data, or other user data. Location services 1306 may include navigation and/or traffic management services and user interfaces, or other location services.

In various embodiments, ride services 1308 may include ride matching and management services to connect a requestor to a provider. Ride services 1308 may include a user interface and or may receive data from requestors and providers through applications executing on their respective devices. Ride services 1308 may, e.g., confirm the identity of requestors and providers using identity management services 1304, and determine that each user is authorized for the requested ride service. In some embodiments, ride services 1308 can identify an appropriate provider using a location obtained from a requestor and location services 1306 to identify, e.g., a closest provider. As such, ride services 1308 can manage the distribution and allocation of provider and requestor resources, consistent with embodiments described herein.

Management system 1302 can connect to various devices through network 1310 and 1312. Networks 1310, 1312 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1310, 1312 can include local area networks (LAN), such as Ethernet, Token-Ring or other LANs. Networks 1310, 1312 can include a wide-area network and/or the Internet. In some embodiments, networks 1310, 1312 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1310, 1312 can include a mobile network, such as a mobile telephone network, cellular network, satellite network, or other mobile network. Networks 1310, 1312 may be the same as communication network 170 in FIG. 1. In some embodiments, networks 1310, 1312 may each include a combination of networks described herein or other networks as are known to one of ordinary skill in the art.

Users may then utilize one or more services provided by management system 1302 using applications executing on provider and requestor devices. As shown in FIG. 13, provider computing devices 1314, 1316, 1318, and/or 1320 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1310, 1312. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1314 can include a vehicle-integrated computing device, such as a vehicle navigation system, or other computing device integrated with the vehicle itself.

In some embodiments, provider computing device 1318 can include a provider communication device configured to communicate with users, such as drivers, passengers, pedestrians, and other users. In some embodiments, provider communication device 1318 can communicate directly with management system 1302 or through another provider computing device, such as provider computing device 1316. In some embodiments, a requestor computing device can communicate 1326 directly with provider communication device 1318 over a peer-to-peer connection, Bluetooth connection, NFC connection, ad hoc wireless network, or any other communication channel or connection. Although particular devices are shown as communicating with management system 1302 over networks 1310 and 1312, in various embodiments, management system 1302 can expose an interface, such as an application programming interface (API) or service provider interface (SPI) to enable various third parties which may serve as an intermediary between end users and management system 1302.

Although requestor/provider management environment 1300 is shown with four provider devices and two requestor devices, any number of devices may be supported. The various components shown and described herein may be implemented in hardware, firmware, software, or combinations thereof. Although one embodiment of a requestor/provider management environment is depicted in FIG. 13, this is merely one implementation and not meant to be limiting.

Figure 14:
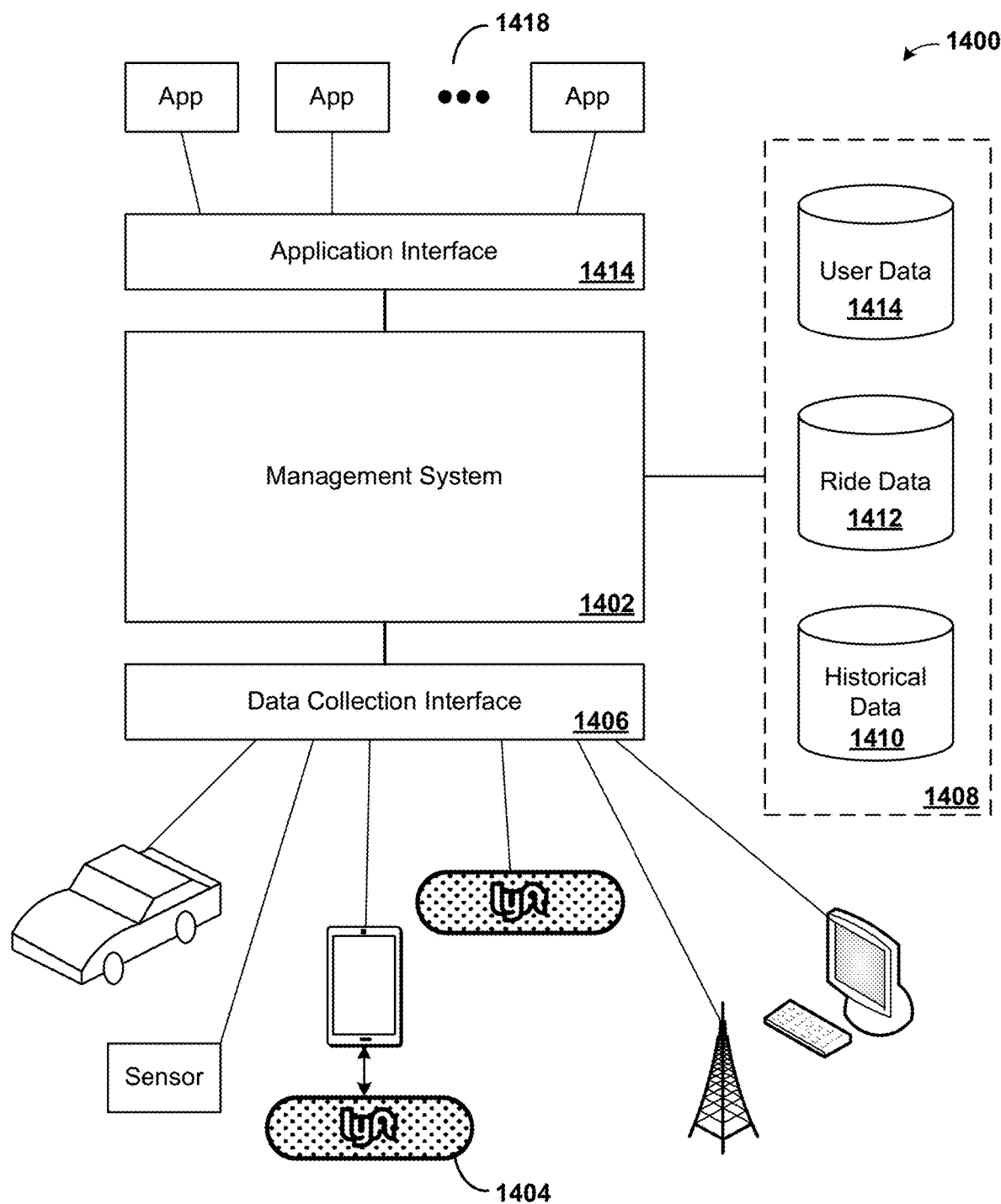
FIG. 14 illustrates an example data collection and application management system, in accordance with various embodiments.

FIG. 14 shows a data collection and application management environment 1400, in accordance with various embodiments. As shown in FIG. 14, management system 1402 may be configured to collect data from various data collection devices 1404 through a data collection interface 1406. As discussed above, management system 1402 may include one or more computers and/or servers or any combination thereof. Data collection devices 1404 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1406 can include, e.g., an extensible device framework configured to support interfaces for each data collection device. In various embodiments, data collection interface 1406 can be extended to support new data collection devices as they are released and/or to update existing interfaces to support changes to existing data collection devices. In various embodiments, data collection devices may communicate with data collection interface 1406 over one or more networks. The networks may include any network or communication protocol as would be recognized by one of ordinary skill in the art, including those networks discussed above.

As shown in FIG. 14, data received from data collection devices 1404 can be stored in data store 1408. Data store 1408 can include one or more data stores, such as databases, object storage systems and services, cloud-based storage services, and other data stores. For example, various data stores may be implemented on a non-transitory storage medium accessible to management system 1402, such as historical data store 1410, ride data store 1412, and user data store 1414. Data stores 1408 can be local to management system 1402, or remote and accessible over a network, such as those networks discussed above or a storage-area network or other networked storage system. In various embodiments, historical data 1410 may include historical traffic data, weather data, request data, road condition data, or any other data for a given region or regions received from various data collection devices. Ride data 1412 may include route data, request data, timing data, and other ride related data, in aggregate and/or by requestor or provider. User data 1414 may include user account data, preferences, location history, and other user-specific data. Although particular data stores are shown, any data collected and/or stored according to the various embodiments described herein may be stored in data stores 1408.

As shown in FIG. 14, an application interface 1416 can be provided by management system 1402 to enable various apps 1418 to access data and/or services available through management system 1402. Apps 1418 can run on various user devices (including provider and requestor computing devices, such as those discussed above) and/or may include cloud-based or other distributed apps configured to run across various devices (e.g., computers, servers, or combinations thereof). Apps 1418 may include, e.g., aggregation and/or reporting apps which may utilize data 1408 to provide various services (e.g., third-party ride request and management apps). In various embodiments, application interface 1416 can include an API and/or SPI enabling third party development of apps 1418. In some embodiments, application interface 1416 may include a web interface, enabling web-based access to data 1408 and/or services provided by management system 1402. In various embodiments, apps 1418 may run on devices configured to communicate with application interface 1416 over one or more networks. The networks may include any network or communication protocol as would be recognized by one of ordinary skill in the art, including those networks discussed above, in accordance with an embodiment of the present disclosure.

Although a particular implementation of environment 1400 is shown in FIG. 14, this is for illustration purposes only and not intended to be limited. In some embodiments, environment 1400 may include fewer or more components, as would be recognized by one or ordinary skill in the art.

Figure 15:
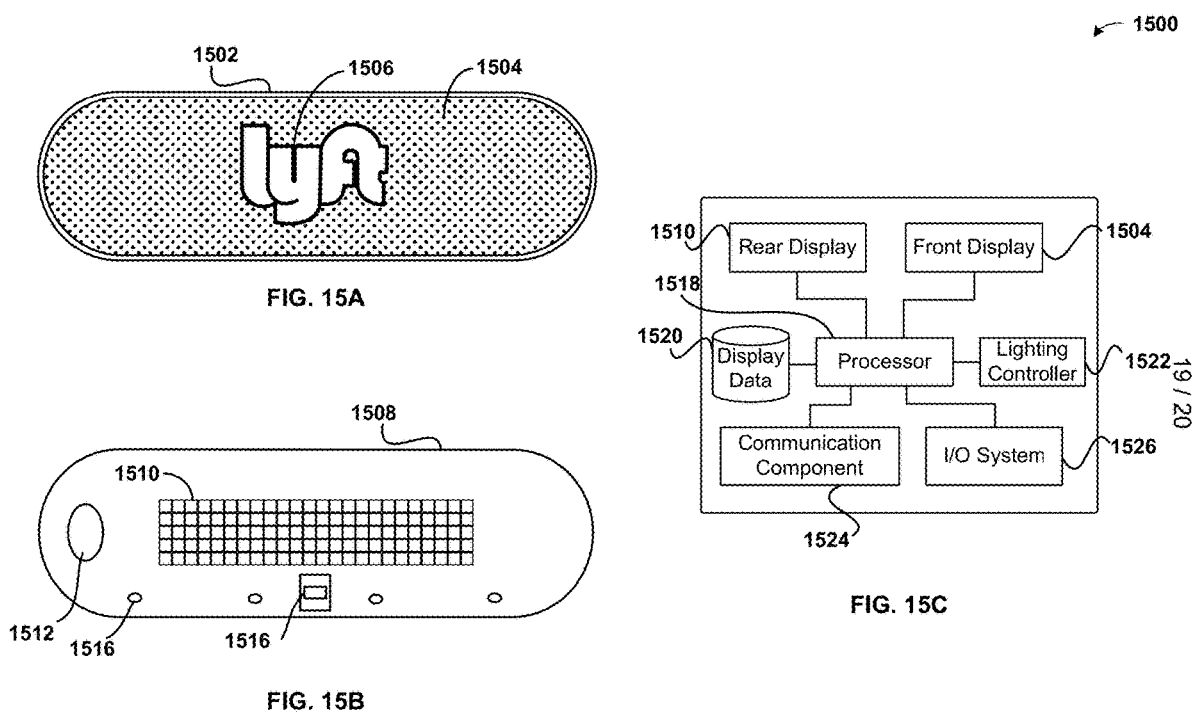
FIGS. 15A-15C illustrates an example provider communication device in accordance with various embodiments.

FIGS. 15A-15C show an example provider communication device 1500 in accordance with various embodiments. As shown in FIG. 15A, a front view 1502 of provider communication device 1500 shows a front display 1504. In some embodiments, front display 1504 may include a secondary region or separate display 1506. As shown in FIG. 15A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1504 can be configured to show colors, patterns, color patterns, or other identifying information to requestors and other users external to a provider vehicle. In some embodiments, the secondary region or separate display 1506 may be configured to display the same, or contrasting, information as front display 1504.

As shown in FIG. 15B, a rear view 1508 of provider communication device 1500 shows a rear display 1510. Rear display 1510, as with front display 1504, rear display 1510 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1510 may be configured to provide information to users external to the provider vehicle who are located behind the provider vehicle. As further shown in FIG. 15B, provider communication device may include a power button 1512 or other switch which can be used to turn on or off the provider communication device. In various embodiments, power button 1512 may be a hardware button or switch that physically controls whether power is provided to provider communication device 1500. Alternatively, power button 1512 may be a soft button that initiates a startup/shutdown procedure managed by software and/or firmware instructions. In some embodiments, provider communication device 1500 may not include a power button 1512. Additionally, provider communication device may include one or more light features 1514 (such as one or more LEDs or other light sources) configured to illuminate areas adjacent to the provider communication device 1500. In some embodiments, provider communication device 1500 can include a connector to enable a provider computing device to be connected to the provider communication device 1500. In some embodiments, power may be provided to the provider communication device through connector 1516.

FIG. 15C shows a block diagram of provider computing device 1500. As shown in FIG. 15C, provider communication device can include a processor 1518. Processor 1518 can control information displayed on rear display 1510 and front display 1504. As noted, each display can display information to different users, depending on the positioning of the users and the provider communication device. In some embodiments, display data 1520 can include stored display patterns, sequences, colors, text, or other data to be displayed on the front and/or rear display. In some embodiments, display data 1520 can be a buffer, storing display data as it is received from a connected provider computing device. In some embodiments, display data 1520 can include a hard disk drive, solid state drive, memory, or other storage device including information from a management system. In some embodiments, lighting controller 1522 can manage the colors and/or other lighting displayed by light features 1514. In some embodiments, communication component 1524 can manage networking or other communication between the provider communication device 1500 and one or more networking components or other computing devices. In various embodiments, communication component 1524 can be configured to communicate over Wi-Fi, Bluetooth, NFC, RF, or any other wired or wireless communication network or protocol. In some embodiments, provider communication device 1500 can include an input/output system 1526 configured to provide output in addition to that provided through the displays and/or to receive inputs from users. For example, I/O system 1526 can include an image capture device configured to recognize motion or gesture-based inputs from a user. Additionally, or alternatively, I/O system 1526 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 16:
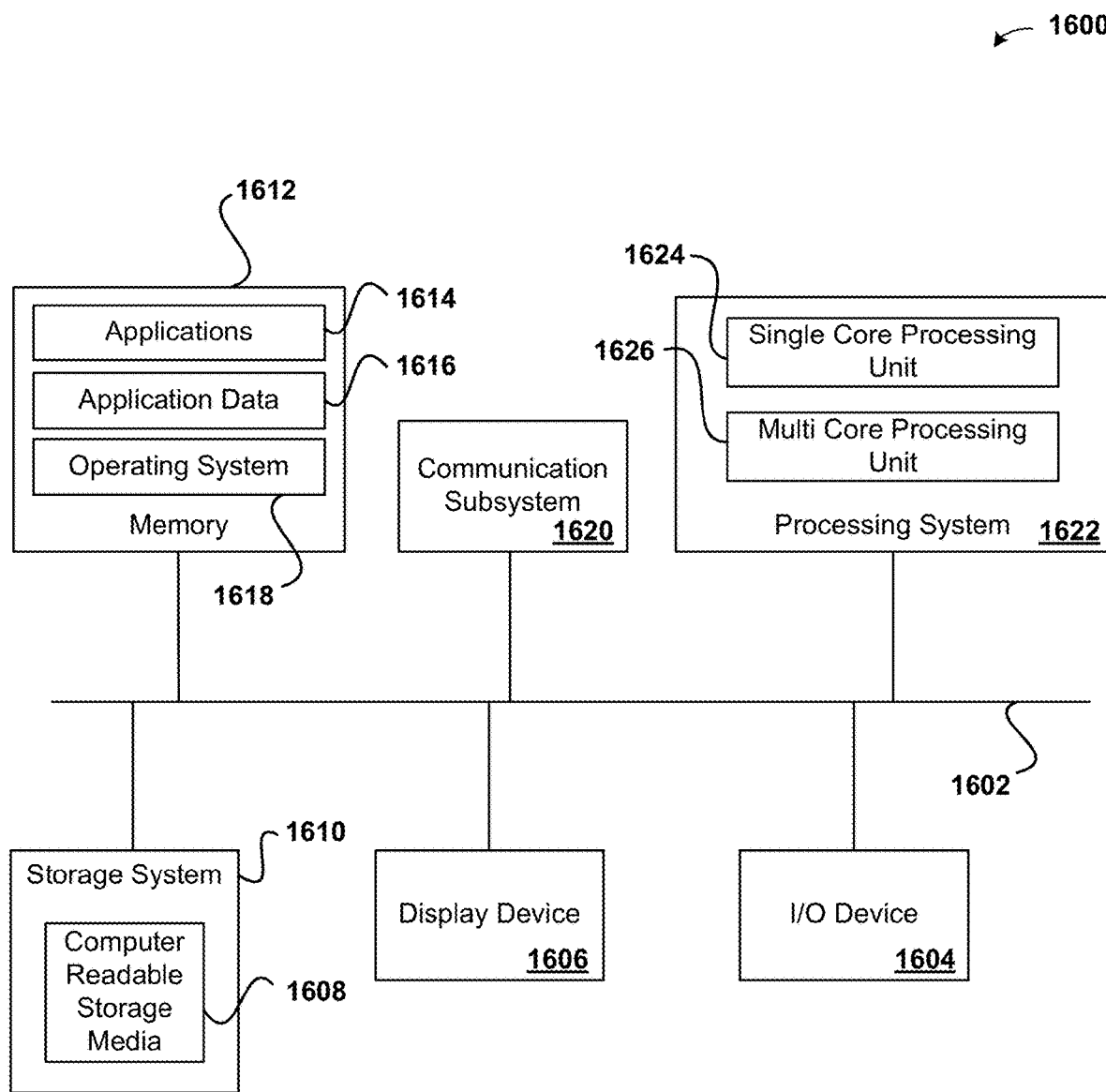
FIG. 16 illustrates an example computer system, in accordance with various embodiments.

FIG. 16 shows an example computer system 1600, in accordance with various embodiments. In various embodiments, computer system 1600 may be used to implement any of the systems, devices, or methods described herein. In some embodiments, computer system 1600 may correspond to any of the various devices described herein, including, but not limited, to mobile devices, tablet computing devices, wearable devices, personal or laptop computers, vehicle-based computing devices, or other devices or systems described herein. As shown in FIG. 16, computer system 1600 can include various subsystems connected by a bus 1602. The subsystems may include an I/O device subsystem 1604, a display device subsystem 1606, and a storage subsystem 1610 including one or more computer readable storage media 1608. The subsystems may also include a memory subsystem 1612, a communication subsystem 1620, and a processing subsystem 1622.

In system 1600, bus 1602 facilitates communication between the various subsystems. Although a single bus 1602 is shown, alternative bus configurations may also be used. Bus 1602 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1602 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1604 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1604 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1600 may include a display device subsystem 1606. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1606 may include a controller and/or interface for controlling and/or communicating with an external display, such as any of the above-mentioned display technologies.

As shown in FIG. 16, system 1600 may include storage subsystem 1610 including various computer readable storage media 1608, such as hard disk drives, solid state drives (including RAM-based and/or flash-based SSDs), or other storage devices. In various embodiments, computer readable storage media 1608 can be configured to store software, including programs, code, or other instructions, that is executable by a processor to provide functionality described herein. In some embodiments, storage system 1610 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1610 can include a media reader, card reader, or other storage interface to communicate with one or more external and/or removable storage devices. In various embodiments, computer readable storage media 1608 can include any appropriate storage medium or combination of storage media. For example, computer readable storage media 1608 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1612 can include various types of memory, including RAM, ROM, flash memory, or other memory. Memory 1612 can include SRAM (static RAM) or DRAM (dynamic RAM). In some embodiments, memory 1612 can include a BIOS (basic input/output system) or other firmware configured to manage initialization of various components during, e.g., startup. As shown in FIG. 16, memory 1612 can include applications 1614 and application data 1616. Applications 1614 may include programs, code, or other instructions, that can be executed by a processor. Applications 1614 can include various applications such as browser clients, location management applications, ride management applications, data management applications, and any other application. Application data 1616 can include any data produced and/or consumed by applications 1614. Memory 1612 can additionally include operating system 1618, such as macOS®, Windows®, Linux®, various UNIX® or UNIX- or Linux-based operating systems, or other operating systems.

System 1600 can also include a communication subsystem 1620 configured to facilitate communication between system 1600 and various external computer systems and/or networks (such as the Internet, a local area network (LAN), a wide area network (WAN), a mobile network, or any other network). Communication subsystem 1620 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 170 in FIG. 1. Additionally, or alternatively, communication subsystem 1620 can include hardware and/or software components to communicate with satellite-based or ground-based location services, such as GPS (global positioning system). In some embodiments, communication subsystem 1620 may include, or interface with, various hardware or software sensors. The sensors may be configured to provide continuous or and/or periodic data or data streams to a computer system through communication subsystem 1620

As shown in FIG. 16, processing system 1622 can include one or more processors or other devices operable to control computing system 1600. Such processors can include single core processors 1624, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1622, such as processors 1624 and 1626, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
    sending, by a dynamic transportation matching system, transport request information associated with a requestor computing device of a requestor to a provider computing device associated with a driver, the transport request information including a request location associated with the requestor computing device;
    receiving, by the dynamic transportation matching system, information indicative of a match from the provider computing device;
    sending, by the dynamic transportation matching system, matched information to the provider computing device associated with the driver, the matched information including requestor information associated with the requestor computing device, wherein the provider computing device is configured to:
        determine if the provider computing device associated with the driver is located within a threshold distance from the request location associated with the requestor computing device;
        receive a location of the requestor computing device from the dynamic transportation matching system;
        determine an interaction indicator associated with the requestor information; and
        cause a provider communication device associated with the driver to display the interaction indicator based on a difference between a location of the provider computing device and the location of the requestor computing device, wherein the provider communication device is a separate device from the provider computing device and the requestor computing device.

2. The method of claim 1, wherein the interaction indicator comprises a proximity indicator and wherein the provider computing device is further configured to:
    determine a proximity vector using the difference between the location of the provider computing device and the location of the requestor computing device; and
    determine the proximity indicator associated with the proximity vector.

3. The method of claim 2, wherein determining a proximity vector using the difference between the location of the provider computing device and the location of the requestor computing device further causes the provider computing device to:
    calculate a magnitude and a direction of the difference between the location of the provider computing device and the location of the requestor computing device.

4. The method of claim 3, wherein determining a proximity indicator associated with the proximity vector further causes the provider computing device to:
    select a proximity indicator from a proximity indicator data store that is associated with the magnitude and the direction of the difference between the location of the provider computing device and the location of the requestor computing device.

5. The method of claim 3, wherein the provider computing device is further configured to:
    determine that the magnitude of the proximity vector is under a presentation threshold before causing to display the proximity indicator through the provider computing device.

6. The method of claim 2, wherein the proximity indicator comprises an animation, a sound, haptic feedback, a color, a pattern, an image, or a pattern of colors that indicates a direction to the location of the requestor computing device.

7. The method of claim 2, wherein the proximity indicator includes an animation, a sound, haptic feedback, a color, a pattern, an image, or a pattern of colors that indicates a distance to the location of the requestor computing device.

8. The method of claim 1, further comprising causing to display the interaction indicator on a display associated with the provider computing device.

9. The method of claim 8, wherein causing to display the interaction indicator on a display associated with the provider computing device further causes the provider computing device to:
cause graphics corresponding to the interaction indicator to be displayed on a rear display of flail the provider communication device.

10. The method of claim 8, wherein causing to display the interaction indicator on a display associated with the provider computing device further causes the provider computing device to:
cause graphics corresponding to the interaction indicator to be presented on at least one display of a vehicle associated with the provider computing device.

11. The method of claim 1, wherein the provider computing device is further configured to:
determine the requestor computing device is outside a second threshold distance from the provider computing device;
determine a second location of the provider computing device;
receive a second location of the requestor computing device from the dynamic transportation matching system;
determine a second proximity vector using a difference between the second location of the provider computing device and the second location of the requestor computing device;
determine a second proximity indicator associated with the second proximity vector; and
cause to display the second proximity indicator on the display of the provider computing device.

12. The method of claim 1, wherein the interaction indicator includes a name, a graphic, and/or a greeting associated with the requestor information.

13. A method comprising:
sending, by a dynamic transportation matching system, transport request information associated with a requestor computing device of a requestor to a provider computing device associated with a driver, the transport request information including a request location associated with the requestor computing device;
receiving, by the dynamic transportation matching system, information indicative of a match from the provider computing device;
sending, by the dynamic transportation matching system, matched information to the provider computing device associated with the driver, the matched information including a navigation route associated with one or more destination locations for one or more requestors, the one or more destination locations being associated with a destination sequence based on the navigation route, each of the destination locations being associated with one of the one or more requestors, and the matched information including requestor information for each of the one or more requestors, wherein the provider computing device is configured to:
identify a first destination based on the destination sequence;
determine a distance to the first destination based on a location of the provider computing device and the first destination;
determine if the distance to the first destination is within a notification distance threshold;
determine first requestor information associated with the first destination of the destination sequence;
cause a provider communication device associated with at least the driver to display an interaction indicator that is associated with the first requestor information, wherein the provider communication device is a separate device from the provider computing device; and
cause to display the first requestor information on a display associated with the provider computing device.

14. The method of claim 13, wherein the provider computing device is further configured to:
determine that the first destination is completed;
identify a second destination based on the destination sequence;
determine a distance to the second destination based on an updated location of the provider computing device and a location of the second destination;
determine if the distance to the second destination is within the notification distance threshold;
determine second requestor information associated with the second destination of the destination sequence;
cause the provider communication device associated with at least the driver to display an interaction indicator that is associated with the second requestor information; and
cause to display the second requestor information through the provider computing device.

15. The method of claim 13, wherein causing to display the second requestor information through the provider computing device includes causing to display the requestor information on a display associated with the provider computing device.

16. The method of claim 13, wherein the first requestor information includes an image, sound, text, color, or a pattern of colors that identifies a requestor associated with the first destination.

17. The method of claim 13, wherein the provider computing device is further configured to:
cause graphics corresponding to the first requestor information to be displayed on a rear display of a provider communication device.

18. The method of claim 13, wherein determining that the first destination is completed further comprises at least one of receiving a ride complete input from the provider or determining a location of the first requestor computing device is over a proximity threshold from the provider computing device.

19. The method of claim 13, wherein the first requestor information is customized by the first requestor and stored in a profile associated with the first requestor at the dynamic transportation matching system.

20. A computing device comprising:
a processor; and
a computer-readable medium comprising code, executable by the processor, to cause a provider computing device associated with a driver to:
receive matched information from a dynamic transportation matching system, the matched information including a request location and requestor information associated with a requestor computing device of a requestor;
determine the provider computing device is located within a threshold distance from the request location;
receive a location of the requestor computing device;
determine an interaction indicator associated with the requestor information; and cause a provider communication device associated with the driver to display the interaction indicator based on a difference between a location of the provider computing device and the location of the requestor computing device, wherein the provider communication device is a separate device from the provider computing device and the requestor computing device.

21. The computing device of claim 20, wherein the interaction indicator includes a proximity indicator and wherein the computing device is further configured to:
   determine a proximity vector using the difference between the location of the computing device and the location of the requestor computing device; and
   determine the proximity indicator associated with the proximity vector.

22. A system comprising:
   a provider computing device that is associated with a driver and is configured to:
      receive matched information from a dynamic transportation matching system, the matched information including a request location and requestor information associated with a requestor computing device of a requestor;
      determine if the provider computing device is located within a threshold distance from the request location;
      receive a location of the requestor computing device from the dynamic transportation matching system;
      determine an interaction indicator associated with the requestor information; and
      cause a provider communication device associated with the driver to display the interaction indicator based on a difference between a location of the provider computing device and the location of the requestor computing device, wherein the provider communication device is a separate device from the provider computing device and the requestor computing device; and
   the dynamic transportation matching system configured to:
      identify the location of a requestor computing device; and
      send the location of the requestor computing device to the provider computing device.

\* \* \* \* \*